US011960388B2

(12) United States Patent
Chang et al.

(10) Patent No.: US 11,960,388 B2
(45) Date of Patent: *Apr. 16, 2024

(54) SYSTEM AND METHOD FOR DATA COLLECTION AND ANALYSIS OF INFORMATION RELATING TO MOBILE APPLICATIONS

(71) Applicant: Google LLC, Mountain View, CA (US)

(72) Inventors: Wayne Chang, San Francisco, CA (US); Jeffrey H. Seibert, Jr., San Francisco, CA (US)

(73) Assignee: Google LLC, Mountain View, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 17/245,493

(22) Filed: Apr. 30, 2021

(65) Prior Publication Data
US 2021/0248062 A1 Aug. 12, 2021

Related U.S. Application Data

(63) Continuation of application No. 15/465,295, filed on Mar. 21, 2017, now Pat. No. 11,016,878, which is a
(Continued)

(51) Int. Cl.
G06F 9/44 (2018.01)
G06F 8/70 (2018.01)
(Continued)

(52) U.S. Cl.
CPC ............ *G06F 11/3688* (2013.01); *G06F 8/70* (2013.01); *G06F 11/0742* (2013.01);
(Continued)

(58) Field of Classification Search
CPC .................................................. G06F 11/3688
See application file for complete search history.

(56) References Cited

U.S. PATENT DOCUMENTS 3,698,009 A 10/1972 Barbier
5,388,263 A 2/1995 Ellis et al.
(Continued)

OTHER PUBLICATIONS

Symbolication, The LLDB Debugger, Powered by Sphinx 1.8.5 & Alabaster 0.7.12; https://lldb.llvm.org/use/symbols.html (Year: 2007).*
(Continued)

*Primary Examiner* — S. Sough
*Assistant Examiner* — Mohammad H Kabir
(74) *Attorney, Agent, or Firm* — Honigman LLP; Brett A. Krueger

(57) ABSTRACT

A system and method are provided for data collection and analysis of information related to applications. Specifically, the developer of the application may install analytic software, which may be embodied as a software development kit (SDK), on an integrated development environment ("IDE") associated with the developer, wherein the analytic software may be installed with a wizard-like interface having a series of easy to follow instructions. Once installed, the application, with the analytic software incorporated therein, may be provided and installed on a plurality of end user devices. Thereafter, the analytic software may work in conjunction with analytic processing logic to assist the developer in obtaining pertinent information related to bugs associated with the application that is being executed on an end user device.

20 Claims, 24 Drawing Sheets

Related U.S. Application Data continuation of application No. 14/476,103, filed on Sep. 3, 2014, now Pat. No. 9,606,904, which is a continuation of application No. 13/426,493, filed on Mar. 21, 2012, now Pat. No. 8,863,086, which is a continuation-in-part of application No. 13/323,166, filed on Dec. 12, 2011, now Pat. No. 9,262,250.

(51) Int. Cl.
*G06F 11/07* (2006.01)
*G06F 11/36* (2006.01)

(52) U.S. Cl.
CPC ...... *G06F 11/0748* (2013.01); *G06F 11/0778* (2013.01); *G06F 11/0784* (2013.01)

(56) References Cited

U.S. PATENT DOCUMENTS

| | | | |
|---|---|---|---|
| 6,009,274 A | 12/1999 | Fletcher et al. | |
| 6,237,137 B1 | 5/2001 | Beelitz | |
| 6,247,149 B1 | 6/2001 | Falls et al. | |
| 6,282,711 B1 | 8/2001 | Halpern et al. | |
| 6,813,707 B1 | 11/2004 | Batcher | |
| 7,143,395 B2 | 11/2006 | Applin et al. | |
| 7,180,531 B2 | 2/2007 | Gery et al. | |
| 7,447,942 B2 | 11/2008 | Chen et al. | |
| 7,484,220 B2 | 1/2009 | Kelley et al. | |
| 8,219,649 B2 | 7/2012 | Ball | |
| 8,230,113 B2 | 7/2012 | Birze et al. | |
| 8,316,343 B2 | 11/2012 | Birze et al. | |
| 8,433,687 B1 | 4/2013 | Pydi | |
| 8,464,223 B2 | 6/2013 | Choi et al. | |
| 8,516,446 B2 | 8/2013 | Williams et al. | |
| 8,533,678 B2 | 9/2013 | Halter et al. | |
| 8,533,844 B2 | 9/2013 | Mahaffey et al. | |
| 8,683,462 B2 | 3/2014 | Goldman | |
| 8,732,530 B2 | 5/2014 | Ng | |
| 2002/0188742 A1 | 12/2002 | Nie | |
| 2003/0005414 A1 | 1/2003 | Elliott et al. | |
| 2003/0120707 A1 | 6/2003 | Bogdan et al. | |
| 2003/0154470 A1 | 8/2003 | Applin et al. | |
| 2004/0030962 A1 | 2/2004 | Swaine et al. | |
| 2004/0123271 A1 | 6/2004 | Bindewald et al. | |
| 2004/0157593 A1 | 8/2004 | Lee et al. | |
| 2004/0230954 A1 | 11/2004 | Dandoy | |
| 2005/0050389 A1 | 3/2005 | Chaurasia | |
| 2005/0097133 A1 | 5/2005 | Pham et al. | |
| 2005/0120162 A1 | 6/2005 | Sivaram | |
| 2005/0120273 A1 | 6/2005 | Hudson et al. | |
| 2005/0190203 A1 | 9/2005 | Gery et al. | |
| 2006/0168587 A1 | 7/2006 | Aslam-Mir | |
| 2006/0174161 A1 | 8/2006 | Sharma | |
| 2007/0006150 A9 | 1/2007 | Walmsley | |
| 2007/0118530 A1 | 5/2007 | Chow et al. | |
| 2007/0294710 A1 | 12/2007 | Meesseman | |
| 2008/0141221 A1 | 6/2008 | Benesovska et al. | |
| 2009/0019270 A1 | 1/2009 | Halter et al. | |
| 2009/0171484 A1 | 7/2009 | Birze et al. | |
| 2009/0113309 A1 | 8/2009 | Shavlik | |
| 2009/0210747 A1 | 8/2009 | Boone et al. | |
| 2009/0293043 A1 | 11/2009 | Begel et al. | |
| 2009/0293118 A1 | 11/2009 | Yan et al. | |
| 2009/0320017 A1 | 12/2009 | Jackson et al. | |
| 2010/0153909 A1 | 6/2010 | Batey et al. | |
| 2010/0174974 A1 | 7/2010 | Brisebois et al. | |
| 2010/0199257 A1 | 8/2010 | Biggerstaff | |
| 2010/0242033 A1 | 9/2010 | Fritsch et al. | |
| 2010/0187525 A1 | 11/2010 | Wagner | |
| 2010/0287525 A1 | 11/2010 | Wagner | |
| 2011/0016356 A1 | 1/2011 | Artzi et al. | |
| 2011/0154305 A1 | 6/2011 | LeRoux et al. | |
| 2011/0185220 A1 | 7/2011 | Foley et al. | |
| 2011/0209008 A1 | 8/2011 | Arapov | |
| 2011/0225074 A1 | 9/2011 | Khosravy et al. | |
| 2011/0231361 A1 | 9/2011 | Patchava et al. | |
| 2011/0246964 A1 | 10/2011 | Cox, III et al. | |
| 2011/0289483 A1 | 11/2011 | Williams et al. | |
| 2011/0302556 A1 | 12/2011 | Drukman et al. | |
| 2011/0314438 A1 | 12/2011 | Surazski et al. | |
| 2012/0042310 A1 | 2/2012 | Kannan et al. | |
| 2012/0102483 A1 | 4/2012 | Goldman | |
| 2012/0102485 A1 | 4/2012 | Goldman | |
| 2012/0110559 A1 | 5/2012 | Dolinsky et al. | |
| 2012/0130801 A1 | 5/2012 | Baranov et al. | |
| 2012/0260232 A1 | 10/2012 | Hirsch et al. | |
| 2012/0283852 A1 | 11/2012 | Birze et al. | |
| 2012/0317155 A1 | 12/2012 | Ogasawara et al. | |
| 2012/0317638 A1 | 12/2012 | Carrara et al. | |
| 2013/0007700 A1 | 1/2013 | Villar et al. | |
| 2013/0047138 A1 | 2/2013 | Radez | |
| 2013/0054682 A1 | 2/2013 | Malik et al. | |
| 2013/0055023 A1 | 2/2013 | Chong et al. | |
| 2013/0067178 A1 | 3/2013 | Szegedi et al. | |
| 2013/0074031 A1 | 3/2013 | Birze et al. | |
| 2013/0132933 A1 | 5/2013 | Rajaram et al. | |
| 2013/0332943 A1 | 12/2013 | Sun et al. | |
| 2014/0033183 A1 | 1/2014 | Brown | |

OTHER PUBLICATIONS

European Patent Office, Office Action for application No. 12809467.9, dated Feb. 17, 2022.

Begemann Ole: "What's New in Xcode 3.2.2", Apr. 7, 2010, pp. 1-6, XP055890213, Retrieved from the Internet: URL: https://oleb.net/blog/2010/04/whats-new-in-xcode-3-2-2/ [retrieved on Feb. 10, 2022].

Anonymous: "Breakpad:Symbols—MozillaWiki", Sep. 8, 2011, pp. 1-4, XP055890216, Retrieved from the Internet: URL:https://wiki.mozilla.org/index.php?title=Breakpad:Symbols&oldid=347720 [retrieved on Feb. 10, 2022].

EP Office Action in European Appln. 12809467.9, dated Mar. 28, 2019, 6 pages.

"Mobile Development Tips: Current mobile development trends in simple English," "Symbolication (or how to analyze Apple's crash logs) under the hood," Oct. 7, 2010, last retrieved from https://myok12.wordpress.com/2010/10/07/symbolication-or-how-to-analyze-apples-crash-logs-under-the-hood/on Apr. 27, 2015, 3 pages.

ABB, "Installation and Setup Guide WebWare SDK," Version 4.9 Revision A, 2008, last retrieved from hpps://library/e/abb/com/public/cce679f6d3d652d8c125766d003a4469/WWW_SDK_4.9_manual.pdf on Oct. 19, 2016.

Adobe, "Developer FAW Adobe Acrobat SDK," Version 8.0, Nov. 2006, last retrieved from http://www.adobe.com/content/dam/Adobe/en/devnet/acrobat/pdfs/Acrobat_SDK_developer_faw.pdf, Oct. 19, 2016.

Fielding et al. "Request for Comments: 2616, Hypertext Transfer Protocol—HTTP/1.1" Jun. 1999.

IBM Blueprints—"Configuring Remote Crash Dump on Linux Systems," XP055052041, Aug. 2009, 26 pages.

Integrated development environment, Wikipedia, Dec. 9, 2010, last retrieved from en.wikipedia.org/w/index.php?title=integrated_development_environment&oldid=401386832, last retrieved Sep. 22, 2014.

Nuance Communication, Inc. "OmniPage 16 Capture SDK Quick Start Guide," 2009 last retrieved from http://www.coriumsoft.com/confluence/download/attachments/5996698/CSDK16_Quick_Start_Guide.pdf?=version=1&modificationDate=1406564064999&api=v2 on Oct. 19, 2016.

PCT Notification of Transmittal of the International Search Report and the Written Opinion of the International Searching Authority, or the Declaration, International Searching Authority, International Application No. PCT/US2012/069074, dated Apr. 2013, 17 pages.

Safari Books Online, Programming Android, 2nd edition, chapter 1 "Installing the Android SDK and Prerequisties," Nov. 10, 2010, later retrieved from https://safaribooksonline.com/library/view/programming-android-2nd/9781449662921/ch01.html on Jun. 1, 2016, 43 pages.

(56) References Cited

OTHER PUBLICATIONS

Server (computing), Wikipedia, Nov. 24, 2010, last retrieved from en.wikipedia.org/w/index/php?title=server(computing_&oldids=398616823, last retrieved Sep. 22, 2014.
UNIX International, Programming Languages SIG< Revision 2.0, "DWARF Debugging Information Format," Jul. 27, 1993.

* cited by examiner

| HEADER | 2105 |
|---|---|
| RESPONSE FLAGS | 2110 |
| CURSOR ID | 2115 |
| STARTING FROM | 2120 |
| NUMBER RETURNED | 2125 |
| DOCUMENTS | 2130 |
| ⋮ | 2135 |

SYSTEM AND METHOD FOR DATA COLLECTION AND ANALYSIS OF INFORMATION RELATING TO MOBILE APPLICATIONS

CROSS REFERENCE TO RELATED APPLICATIONS

This U.S. patent application is a continuation of, and claims priority under 35 U.S.C. § 120 from, U.S. patent application Ser. No. 15/465,295, filed on Mar. 21, 2017, which is a continuation of U.S. patent application Ser. No. 14/476,103, filed on Sep. 3, 2014, which is a continuation of U.S. patent application Ser. No. 13/426,493, filed on Mar. 21, 2012, which is a continuation-in-part of U.S. patent application Ser. No. 13/323,166, filed on Dec. 12, 2011. The disclosures of these prior applications are considered part of the disclosure of this application and are hereby incorporated by reference in their entireties.

TECHNICAL FIELD

The present disclosure relates generally to application debugging and, more particularly, to providing a developer of an application with pertinent information associated with errors, bugs, and/or defects associated with an application that is executing on an end user's mobile device.

BACKGROUND

Debugging is a process of finding and extracting bugs, error and/or defects (hereinafter generally "bugs"), in a computer program, such as an application, thus making the application behave as expected by the application developer. Conventionally, developers have been primarily limited to debugging applications prior to those applications being distributed to end users for installation on an end user's mobile device, e.g., a smart phone, personal digital assistant (PDA), tablet computer, etc. With the growth of applications that may be provided to end users across the world (e.g., mobile applications), developers have limited ways of receiving information as to what may cause specific bugs in the applications, while the application is being utilized by the end user and executed on an end user's device.

One technique is to have the developer provide a test group of end users with the application to obtain feedback and test results regarding the application prior to distributing the final version to all end users. Such testing, commonly referred to as "beta testing", is a well known technique to identify certain bugs prior to the general release of a product.

Further, the developer may receive feedback from end users after the distribution of the final version; however, in such cases, the end users are required to take a proactive role in contacting the developer and informing them as to the issues they may have with the application when executed on the end user's device. In both scenarios, end user initiation is required (e.g., participating in the test group and/or contacting the developer). Further, the developer may not be provided with all pertinent and useful information regarding the bugs, the end user's device (e.g., type), and/or other information that may help the developer in understanding and remedying the bug so that the application behaves as expected.

SUMMARY

The disadvantages of the prior art are overcome by providing a system and method for data collection and analysis of information related to applications, and more specifically, mobile applications. Specifically, the developer of the application may install analytic software, which may be embodied as a software development kit (SDK), on an integrated development environment ("IDE") associated with the developer, wherein the analytic software may be installed with a wizard-like interface having a series of easy to follow instructions. The analytic software may be any type of software associated with a SDK, such as an advertising framework, or any other framework, as known by those skilled in the art. Illustratively, the analytic software is installed in a source code format that may be integrated into the developer's source code for the application. During compilation and/or a build of the application, the analytic software is incorporated into the application. Once installed, the application, with the analytic software incorporated therein, may be provided and installed on a plurality of end user devices. Thereafter, the analytic software may work in conjunction with analytic processing logic to assist the developer in obtaining pertinent information related to bugs associated with the application that is being executed on the end user devices.

Specifically, in a first embodiment, particular debugging information, for example, a dSYM file, may be automatically sent from the developer's IDE to a web server over a network, wherein the web server may be managed by an analytic service provider. Specifically, this is accomplished because the analytic software was installed on the IDE, which in turn may automatically detect when a new dSYM is generated, may then de-duplicate the dSYM based on an identifier (to obtain the most current version of the dSYM), and may then automatically upload or send the particular debugging information from the IDE to the web server. A dSYM file may be created, as known by those skilled in the art, when an Xcode project is built. A dSYM may allow a user to strip debug symbols from their built application, thus substantially reducing its size. Specifically, when a user sends a "crashdump," the developer with the dSYM file can use the original dSYM file to generate a proper "stacktrace," as know by those skilled in the art, for debugging. Thereafter, an end user may experience a crash or other error, associated with the application that incorporates the analytic software therein, on the end user's device. The crash data may then be sent to the web server over the network. Analytic processing logic may then be used in conjunction with the debugging information, that was sent to the server, to "symbolicate" the crash data to obtain pertinent information associated with bugs of the application executing on the end user's device (e.g., source code file names, method names, and/or line numbers).

The developer may be notified, for example by receiving an email, that the crash data is available for the developer to review. The developer may then access the web server, managed by the analytic service provider, to view the pertinent information associated with the bugs of the application.

In a second embodiment, a developer may be reluctant in sending the particular debugging information (e.g., dSYM file) over the network to the web server due to regulatory or compliance constraints. In such a situation, an identifier, extracted from the debugging information that remains resident on the developer's system, is sent to the web server, wherein the identifier is associated with an address of the developer's system (e.g., IP address) and indexed. Thereafter, an end user may experience a bug associated with the application (the analytic software incorporated therein) on the end user's device, and the crash data may be sent to the web server over the network. The web server may then extract the same identifier from the crash data to identify the address of the developer's system. Analytic processing logic on the developer's system may then be used in conjunction with the debugging information to "symbolicate" the crash data to obtain pertinent information associated with the bug of the application on end user's device (e.g., source code file names, method names, and line numbers). The pertinent information may then be sent to the web server, and the developer may be notified, for example by receiving an email, that the crash data may be available for the developer to review. The developer may then access the web server, managed by the analytic service provider, to view the pertinent information associated with the crash of the application.

It is noted, that a third embodiment may entail a system that has some developers utilizing the first embodiment and some developers utilizing the second embodiment, wherein the overall system is a "hybrid system" that functions to provide both capabilities.

Advantageously, a developer of an application may identify the particular location within the source code and other pertinent information associated with bugs that have occurred while the end user is utilizing or executing the application on an end user's device.

DESCRIPTION OF DRAWINGS

The embodiments herein may be better understood by referring to the following description in conjunction with the accompanying drawings in which like reference numerals indicate identically or functionally similar elements, of which:

FIG. 21 is an exemplary message data structure that may be sent between a web server and a database;

Like reference symbols in the various drawings indicate like elements.

DETAILED DESCRIPTION

A. Environment

A computer network is a geographically distributed collection of entities interconnected by communication links and segments for transporting data between end nodes, such as personal computers and workstations. Many types of networks are available, with the types ranging from Wi-Fi networks, cell phone networks, local area networks (LANs) to wide area networks (WANs). Wi-Fi is a mechanism for wirelessly connecting a plurality of electronic devices (e.g., computers, cell phones, etc.). A device enabled with Wi-Fi capabilities may connect to the Internet via a wireless network access point, as know by those skilled in the art. Cellular networks are radio network distributed over land areas called "cells", wherein each cell may be served by at least one fixed-location transceiver known as a cell site or base station. When joined together, these cells may provide radio coverage over a wide geographic area. As known by those skilled in the art, this may enable a large number of portable transceivers (e.g., mobile phones) to communicate with each other. LANs typically connect the entities over dedicated private communications links located in the same general physical location, such as a building or campus. WANs, on the other hand, typically connect geographically dispersed entities over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as the Transmission Control Protocol/Internet Protocol (TCP/IP), Hypertext Transfer Protocol (HTTP). In this context, a protocol consists of a set of rules defining how the entities interact with each other and how packets and messages are exchanged.

Figure 1:
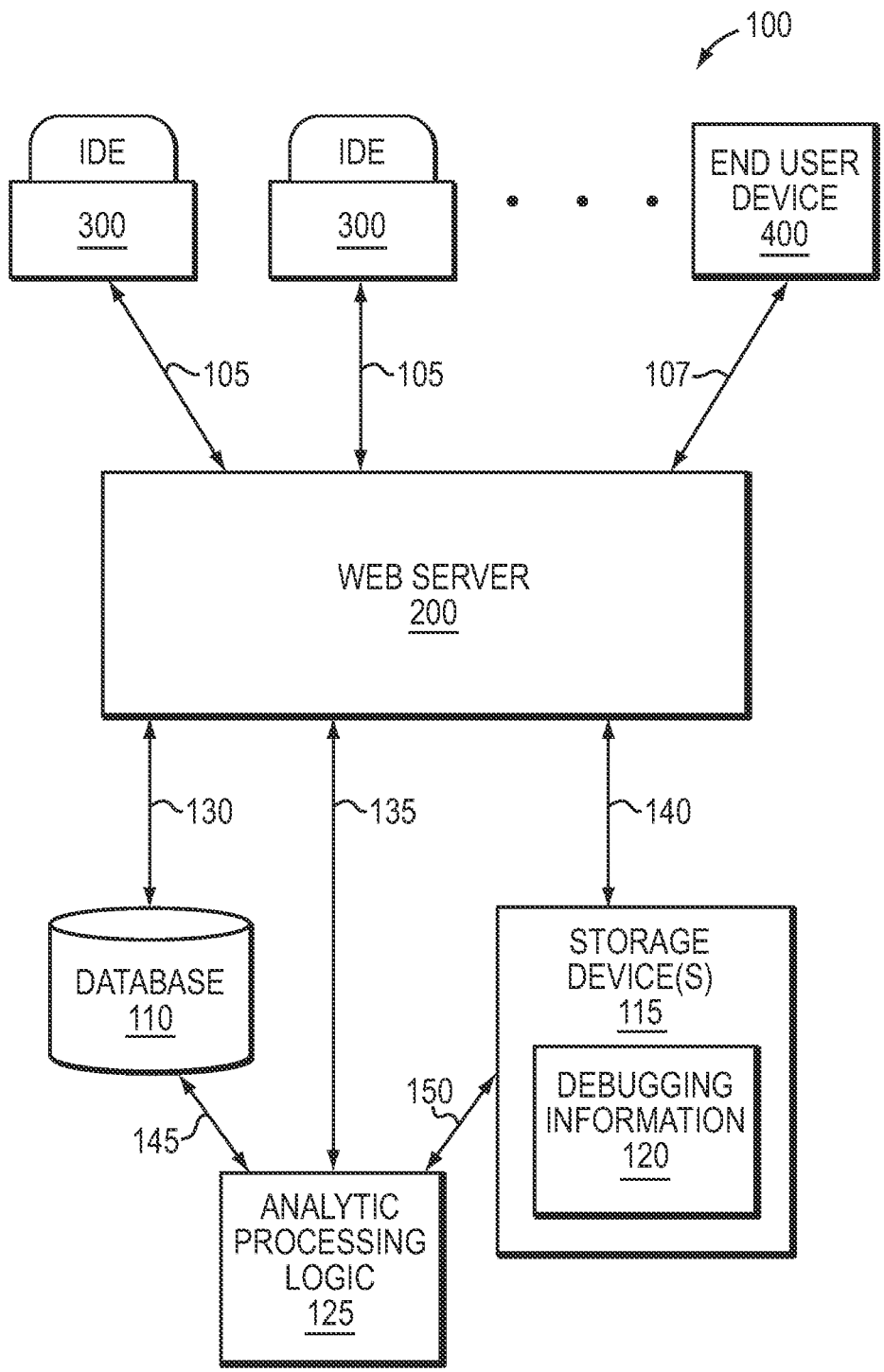
FIG. 1 is a schematic block diagram of an exemplary computing environment.

FIG. 1 is a schematic block diagram of an exemplary computing environment 100. Specifically, the computing environment 100 may include one or more integrated development environments (IDE) 300 coupled to one or more web servers 200 (managed by an analytic service provider), interconnected by one or more communication links 105. Developer IDE 300, described further below in reference to FIG. 3, represent development environments utilized by application developers for creation of source code to be compiled, or otherwise built, to generate applications to be distributed for execution on end user device 400. Illustratively, IDE 300 may implement an Xcode development environment. As known by those skilled in the art, Xcode is a suite of tools for developing software on a Macintosh (MAC) Operating System X (OS), developed by Apple Inc. While examples herein are described in relation to IDE 300 utilizing Xcode, it should be noted that the teaching of the present invention may be utilized with any development environment. Web server 200, described further below in reference to FIG. 2, is illustratively utilized to enable distribution of the analytic software to IDE 300, collection of data from IDE 300 and end user device 400, as well as provides proper message passing among the various entities in environment 100.

Further, end user device 400, database 110, analytic processing logic 125, and storage device(s) 115 may be coupled to web servers 200 via communication link(s) 107, 130, 135, 140, 145, and 150, respectively. Storage device(s) 115 may for example store debugging information (e.g., dSYM file), among other data associated with the IDE 300 and end user device 400. End user device 400, described further below in reference to FIG. 4, may comprise any device capable of executing applications. Illustratively, end user device 400 may comprise a smart phone, a personal digital assistant and/or a tablet computer. Exemplary smart phones may utilize the Android operating system, available from Google, Inc., and/or the iOS system, available from Apple, Inc. It should be noted that other smart phones may be utilized in alternative embodiments. As such, the description herein directed to development for iOS systems should be taken as exemplary only.

It is noted that links 105, 107, 130, 135, 140, 145, and 150 are depicted in FIG. 1 as separate and individual links for simplicity purposes, and that communications between the devices may occur over a single link (e.g., Internet), a plurality of links, or virtual links as know by those skilled in the art. Moreover, one or more web servers 200, database 110, analytic processing logic 125, and storage device(s) 115 may all reside on a single device, or a plurality of devices, and managed by the analytic service provider. The devices are shown as separate entities in FIG. 1 for simplicity purposes. Further, those skilled in the art will understand that any number of devices and/or links may be used in the computer environment, and that the view shown herein is for simplicity.

Figure 2:
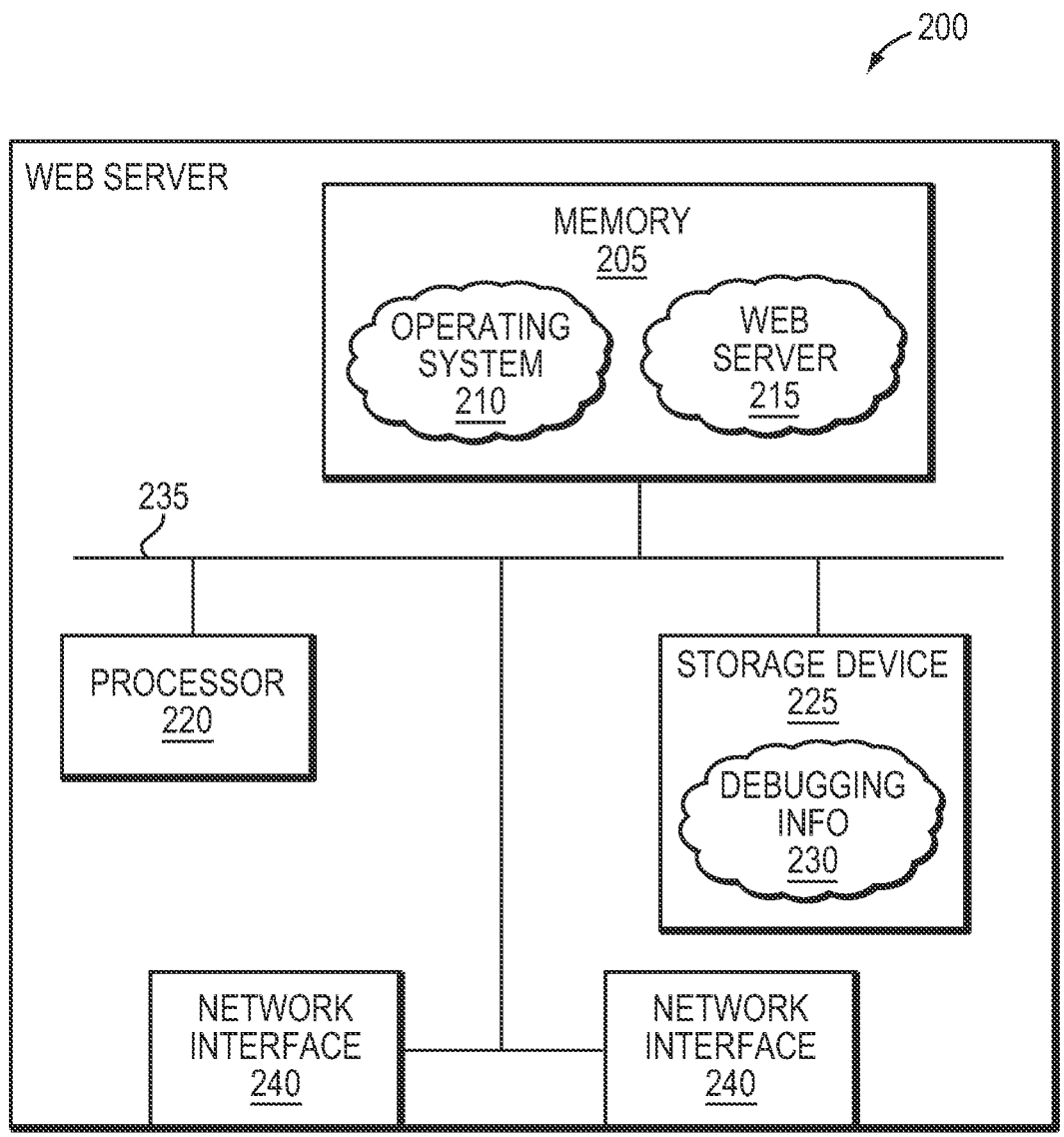
FIG. 2 is a schematic block diagram of an exemplary web server.
Figure 3:
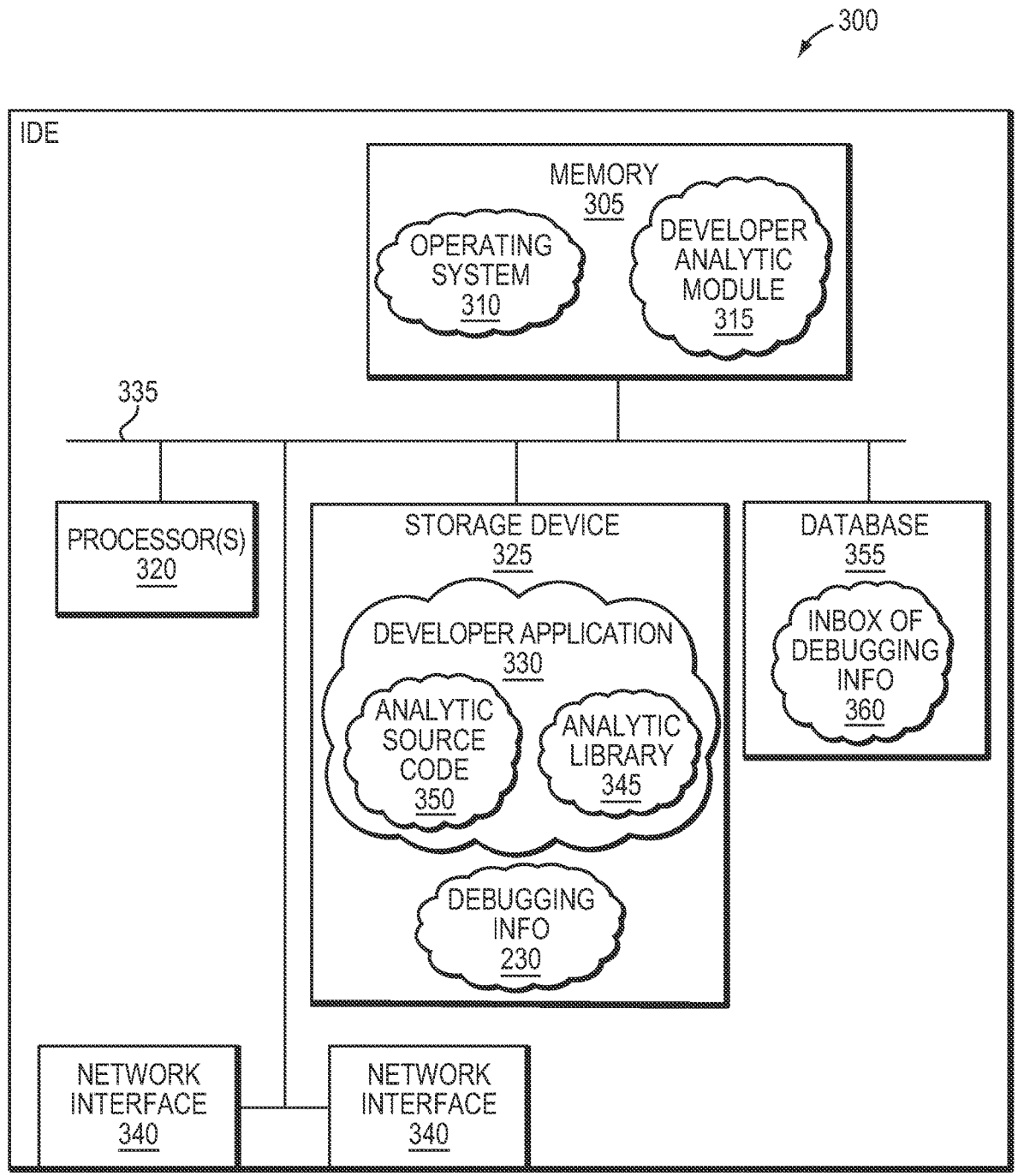
FIG. 3 is a schematic block diagram of an exemplary IDE.

FIG. 2 is a schematic block diagram of an exemplary web server 200. The web server 200 may comprise a plurality of network interfaces 240, one or more processors 220, storage device 225, and a memory 205 interconnected by a system bus 235. The network interfaces 240 contain the mechanical, electrical, and signaling circuitry for communicating data over physical links coupled to a network, such as links 105, 107, 130, 135, 145, and 140. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, known to those skilled in the art.

The memory 205 comprises a plurality of locations that are addressable by the processor(s) 220 and the network interfaces 240 for storing software programs and data structures associated with the embodiments described herein. The processor 240 may comprise necessary elements or logic adapted to execute the software programs and manipulate the data structures. An operating system 210, portions of which are typically resident in memory 205 and executed by the processor(s), functionally organizes the web server 200 by, inter alia, invoking network operations in support of software processes and/or services executing on the web server. A web server 215, portions of which are typically resident in memory 205 are executed by the processor(s), functionally store and execute logical commands inputted by the analytic service provider and developers. For example, web server 215 may implement a website managed by the analytic service provider, wherein developer may access that web site to obtain pertinent information associated with their applications and information associated with bugs incurred on the developer's application executing on an end user device. It should be noted that any system for distribution of the analytic software, collection of debugging information and crash data, etc. may be utilized. As such, the description of a web server should be taken as exemplary only. In alternative embodiments, the various functionalities may be distributed among a plurality of servers. As such, the description of a single web server 200 should be taken as exemplary only.

A storage device 225 may store debugging information 230, such as a dSYM file, that is sent, for example automatically, over the communication links from an IDE. Those skilled in the art will understand that a dSYM file may contain a plurality of mappings between memory offsets, such as addresses, and method names and line numbers associated with the built/compiled application created by the developer. The structure and information relating to a dSYM file and the functions associated therewith are well-known and described in more detail in "DWARF Debugging Information Format," dated Jul. 27, 1993, the contents of which are hereby incorporated by reference. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

FIG. 3 is a schematic block diagram of an exemplary IDE 300. The IDE may comprise a plurality of network interfaces 340, one or more processors 320, a memory 305, a storage device 325, and database 355 interconnected by a system bus 335. The network interfaces 340 contain the mechanical, electrical, and signaling circuitry for communicating data over physical links coupled to a network, such as links 105, 107, 130, 135, 140, 145, and 150. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 340 may also be used to implement one or more virtual network interfaces, such as for Virtual Private Network (VPN) access, known to those skilled in the art.

The memory 305 comprises a plurality of locations that are addressable by the processor(s) 320 and the network interfaces 340 for storing software programs and data structures associated with the embodiments described herein. The processor 340 may comprise necessary elements or logic adapted to execute the software programs and manipulate the data structures. An operating system 310, portions of which are typically resident in memory 305 and executed by the processor(s), functionally organizes the IDE by, inter alia, invoking network operations in support of software processes and/or services executing on the web server.

A developer analytic module 315, that is associated with the analytic service provider, portions of which are typically resident in memory 305 are executed by the processor(s), may functionally be installed onto IDE 300 by a user, such as a developer. The analytic module 315 may, for example, assists in gathering debugging information 230 associated with the developer's application on IDE 300. A storage device 325 may store debugging information 230, such as a dSYM file, that is associated with application 330 of the developer. Further, storage device 325 may also store the application 330 of the developer that may be written and compiled on IDE 300 by a developer, for example. An analytic library 345 and analytic source code 350, that are associated with an analytic service provider, may be installed/incorporated within application 330 of the developer through use of an analytic installer, that is described in further detail with reference to FIG. 6 and FIGS. 9-12.

Database 355, is illustratively configured to store an index of the debugging information 360 that may be gathered by developer analytic module 315. For example, database 355 may store an index of a URL of a dSYM file by an identifier, e.g., a universally unique identifier (UUID), associated with the debugging information 230. In an illustrative embodiment, database 355 may be implemented using the well-know SQLite database, however, it should be noted that in alternative embodiments any type of data structure that permits indexing, including, e.g., hash tables, etc., may be used. As such, the description of a database should be taken as exemplary only. Also, while the embodiments herein are described in terms of processes or services stored in memory, alternative embodiments also include the processes described herein being embodied as modules consisting of hardware, software, firmware, or combinations thereof.

Figure 4:
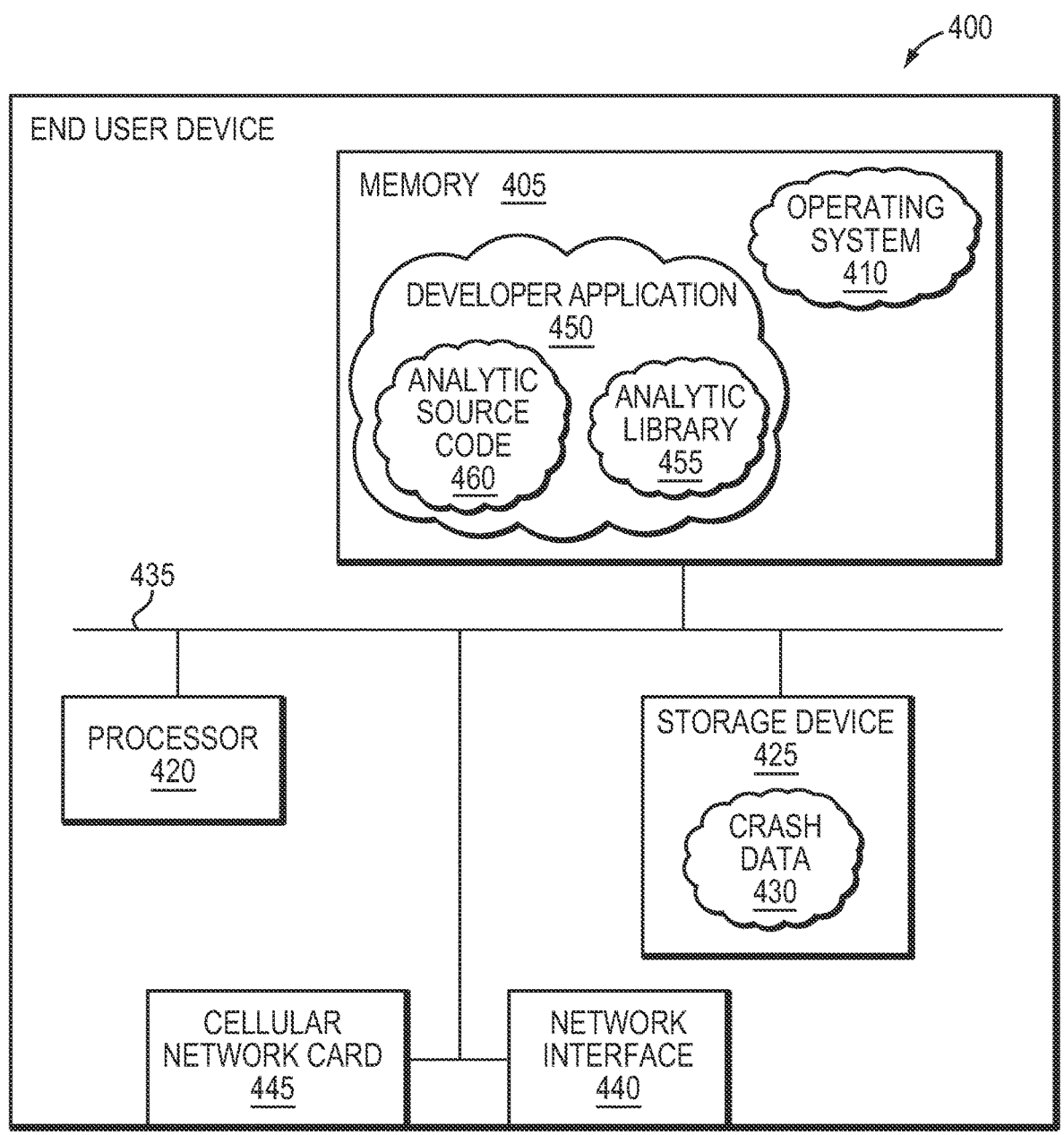
FIG. 4 is a schematic block diagram of an exemplary end user device.

FIG. 4 is a schematic block diagram of an exemplary end user device 400. End user device 400 may comprise any device capable of executing applications. Illustratively, end user devices 400 may comprise a smart phone, a personal digital assistant and/or a tablet computer. Exemplary smart phones may utilize the Android operation system, available from Google, Inc., and/or the iOS system, available from Apple, Inc. It should be noted that other smart phones may be utilized in alternative embodiments. As such, the description herein directed to the development for iOS systems should be taken as exemplary only. The end user device may comprise network interfaces 440, one or more processors 420, a memory 405, a storage device 425, and a cellular network card 445 interconnected by a system bus 435. The network interfaces 440 and cellular network 445 contain the mechanical, electrical, and signaling circuitry for communicating data over physical links coupled to a network, such as links 105, 107, 130, 135, 140, 145, and 150. The network interface 440 and cellular network card 445 may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 440 may also be used to implement one or more virtual network interfaces, such as for Virtual Private Network (VPN) access, known to those skilled in the art.

The memory 405 comprises a plurality of locations that are addressable by the processor(s) 420 and the network interfaces 440 for storing software programs and data structures associated with the embodiments described herein. The processor 420 may comprise necessary elements or logic adapted to execute the software programs and manipulate the data structures. An operating system 410, portions of which are typically resident in memory 405 and executed by the processor(s), functionally organizes the end user device by, inter alia, invoking network operations in support of software processes and/or services executing on the web server. An application 450, that may have been created by a developer on an IDE, and portions of which are typically resident in memory 405, are executed by the processor(s). Application 450 may be downloaded or installed on end user device 400 in any manner known to those skilled in the art. Further, application 450 includes analytic library 455 and analytic source code 460 that may have been incorporated within application 450 on IDE 300 by the developer. When the application 450 encounters a bug, crash data 430 associated with the bug and application (e.g., running processes, current RAM usage, IP address and network settings, physical orientation of the device in 3D space, among other aspects) may be created. Crash data 430 may be stored on storage device 425. Such storage devices may be non-volatile random access memory, flash, micro HD, etc. Also, while the embodiments herein are described in terms of processes or services stored in memory, alternative embodiments also include the processes described herein being embodied as modules consisting of hardware, software, firmware, or combinations thereof.

B. Overview of Analysis of Bugs in Application

Figure 5:
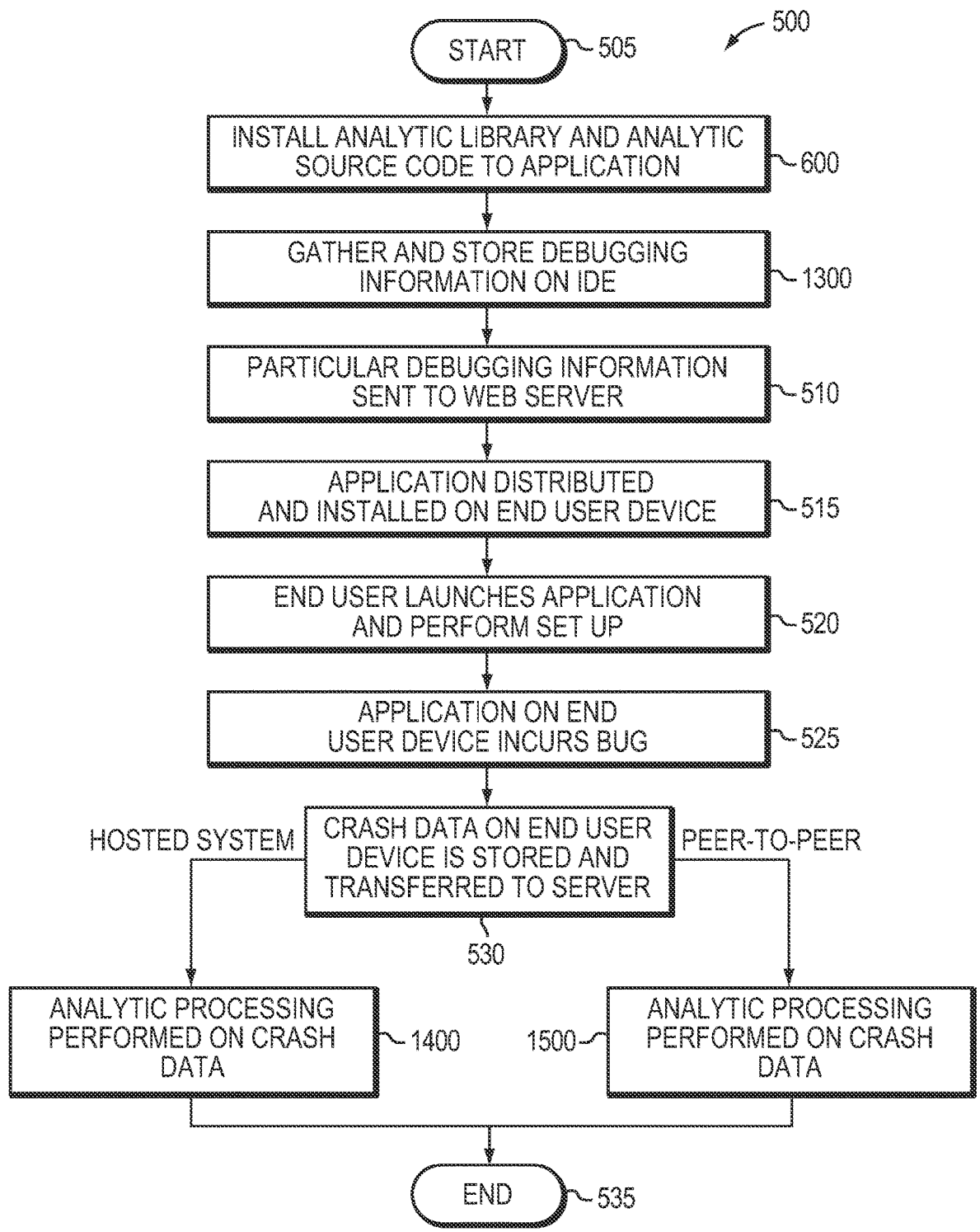
FIG. 5 is a flowchart detailing the steps of an exemplary procedure for providing a developer of an application pertinent information associated with bugs associated with the application that is executing on an end user's device.

FIG. 5 is a flowchart detailing the steps of an exemplary procedure 500 for providing a developer of an application pertinent information associated with bugs associated with the application that is executing on an end user's device. The procedure 500 starts at step 505 and continues to step 600, described below in reference to FIG. 6, where analytic source code and/or an analytic library is installed within the application on an IDE. In step 1300, debugging information (e.g., version number, icon, dSYM file) may be locally stored on the IDE. In step 510, particular debugging information, such as a dSYM file, may be automatically sent over a network, to web server 200, and stored at storage device 115. As explained above, the dSYM is capable of being automatically uploaded or sent to web server 200 due to the installation of the analytic source code an/or analytic library. Specifically, the integration of the analytic source code and/or analytic library may automatically detect when a new dSYM is generated on the IDE, de-duplicate the dSYM based on an identifier, and automatically upload or send the dSYM to the web server. As described further below, with reference to FIGS. 16-23, a plurality of different types of messages may be utilized to transmit the particular debugging information from the IDE to the storage device, and other entities as described above in reference to FIG. 1. The particular debugging information is typically generated when the application developer compiles a new version of the application, i.e., a new "build" of the application. For example, and as know by those skilled in the art, a developer may select a particular command, such as a "DWARF with dSYM file", as a Debug Information Format in the build settings of an application (e.g., Xcode). A dSYM may then be generated automatically when the application is complied, wherein the dSYM file may be placed in the same destination, e.g., folder, as the resulting/compiled application file. Further, and as described in further detail below, particular debugging information, such as an identifier, extracted from the debugging information that remains resident on the developer's system, is sent to the web server, wherein the identifier is associated with an address of the developer's system (e.g., IP address) and indexed.

In step 515, the application may be distributed and installed on end user devices, such as mobile phones or other entities. For example, the application may be downloaded on the end user device over a cellular network or any other type of network. For example, the application may be available to end users through libraries associated with particular end user devices (e.g., iTunes on an iPhone). The end user may then select the develop application from the library and download the application on the end user device. The end user may then utilize the application on his/her end user device. In other instances, the application may simply be available on a particular website, that the user may find through conventional web based search techniques. After finding the application, the user may then download the application from the website and utilize the application on the end user device. As is known to those skilled in the art, applications may be available for installation on an end user device through various techniques, and the techniques described above are simply exemplary in nature.

In step 520, the application may be launched, by an end user for example, on the end user device. The end user may then utilize the application, that includes the analytic library and/or the analytic software, on the end user device. The end user, may for example, go through a series of set up steps associated with whether crash detection and reporting. For example, some user may determine that they do not want to enable crash detection and reporting for privacy reasons or other reasons. In such a case, the user of the end user device may indicate, utilizing a keypad associated with the end user device, that he/she wishes to disable crash detection and reporting on the end user device. Thereafter, for example when network connectivity is obtained (e.g., cell phone network or WIFI network), the preference indicated by the user may be transmitted to the web server. Thereafter, when the application incurs a bug, the crash data may remain on the end user device instead of sending the crash data to web server 200 for analytic processor.

In step 525, the application on the end user device encounters a bug. For example, the application may crash unexpectedly or may behave in a manner not intended. In step 530, crash data (e.g., running processes, current usage, network address and network settings, physical orientation of the device in 3D space, among other aspects) may be stored locally on the end user device. Thereafter, after network connectivity is obtained, the crash data may be sent and to web server 200 and stored at storage device 115 that is managed by the analytic service provider. For example, the end user device may be out of "range" (e.g., in a tunnel) if he is utilizing a device that is trying to connect to a cellular phone network. Alternatively, the end user device may be device, such a laptop or iPad, that has WIFI connection capabilities, but for whatever reason has lost its connection or is not connected to the WIFI network. In step 1400, analytic processing, that may be associated with the analytic service provider and/or the IDE, may be performed on the crash data, utilizing the dSYM file associated with the application and stored on storage device 115. Specifically, analytic processing logic 125 may be utilized by the analytic service provider to perform the processing as described in further detail with respect to FIG. 14. Alternatively, in step 1500, analytic processing, associated with the IDE, may be performed on the crash data, utilizing the dSYM file associated with the application and stored locally on the IDE. Specifically, processor 320 of the IDE may be utilized to perform the analytic processing on the crash data as described in further detail with respect to FIG. 15. The procedure 500 then ends at step 535.

C. Installation of Analytic Software

Figure 6:
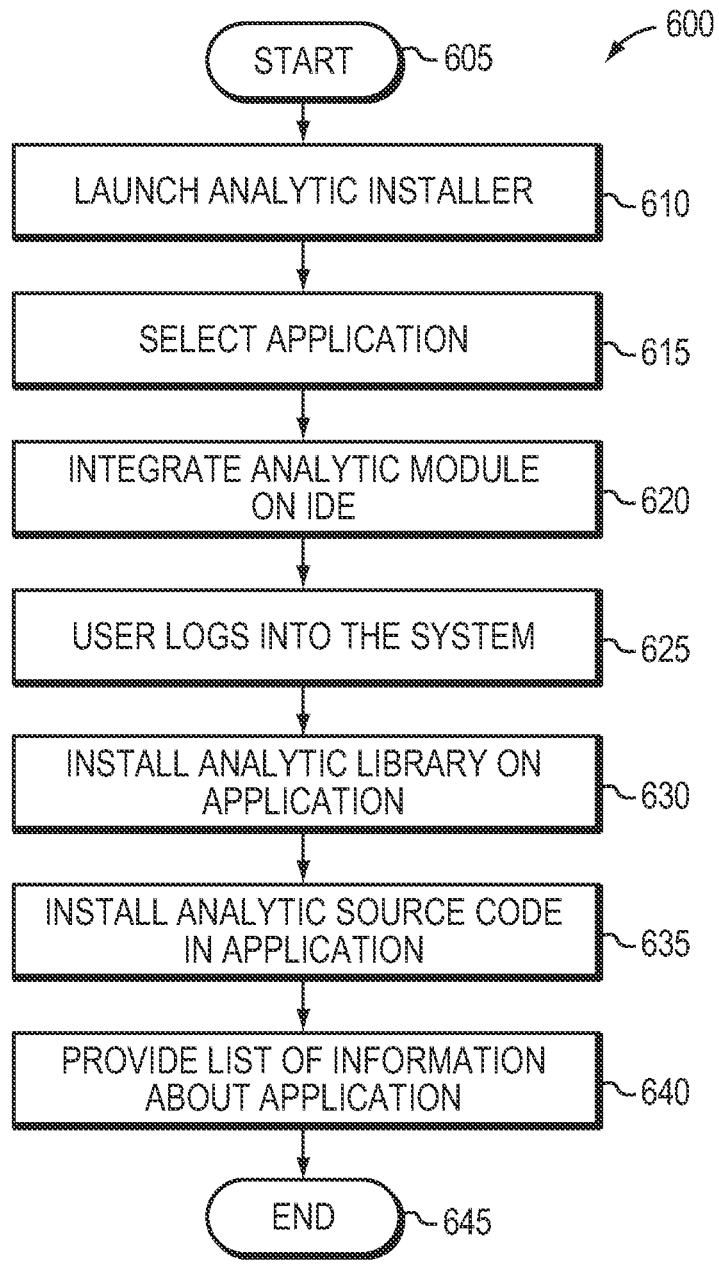
FIG. 6 is a flowchart detailing the steps of an exemplary procedure for installing analytic software on an IDE.

FIG. 6 is a flowchart detailing the steps of an exemplary procedure 600 for installing analytic software, such as a software development kit ("SDK"), on an IDE 300. It is noted that the SDK may be analytic software or any type of SKD, such as an advertising framework. Further, it is noted that the analytic software may be obtained in a variety of ways. For example, the analytic software may be downloaded on the IDE from a library (e.g., iTunes), or downloaded from a website. In an alternate embodiment, the launcher may reside at a remote location, and may simply reside thereon wherein the IDE may have access to the analytic software via the Internet. The procedure 600 starts at step 605 and continues to step 610, where an analytic installer is launched. For example, the analytic software may be launched utilizing a GUI or a command line interface (CLI), as known by those skilled in the art.

Figure 7:
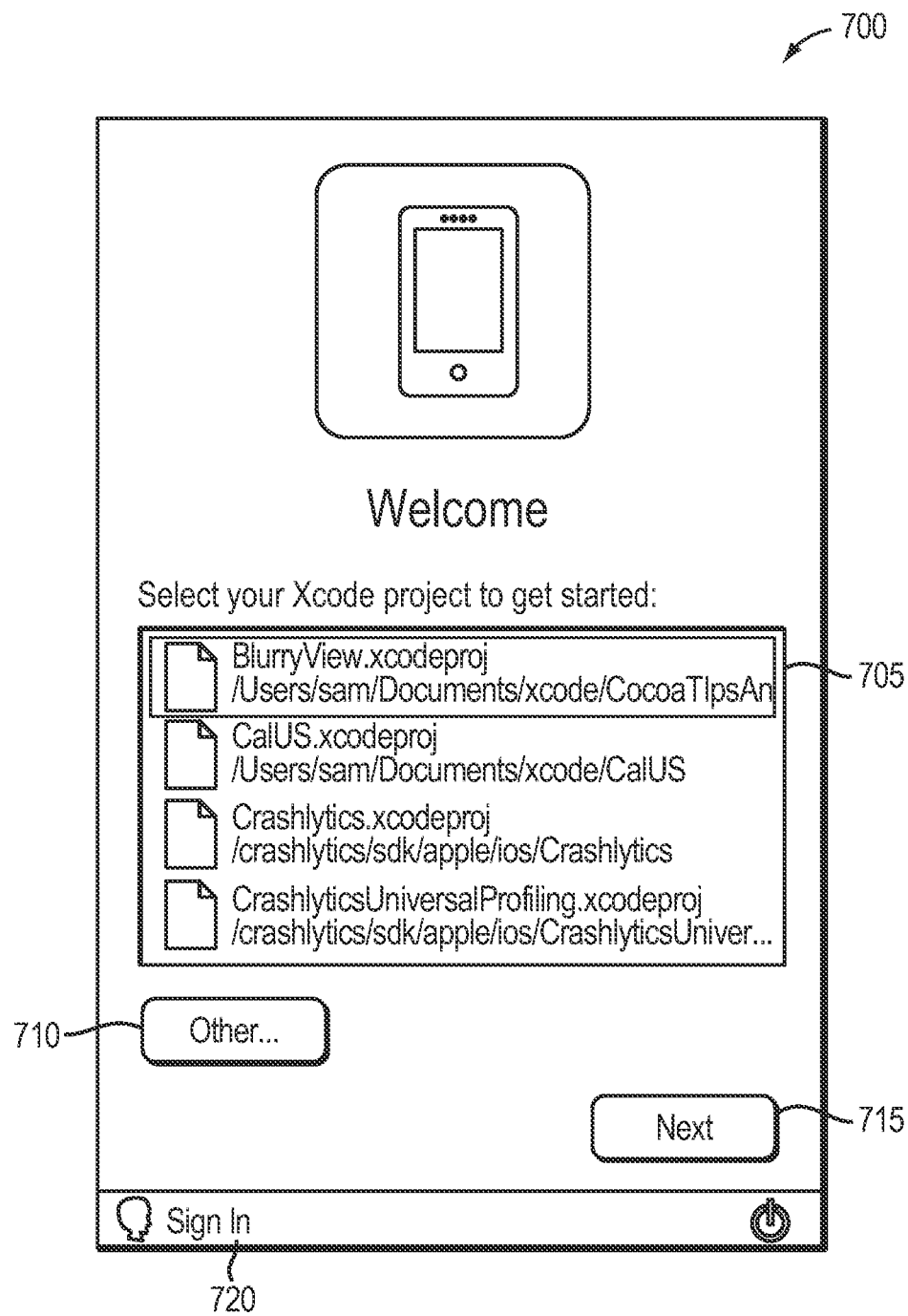
FIG. 7 is an exemplary graphical user interface (GUI) window displayed to a developer to enable selection of an application to be incorporated with the analytic software.

After the analytic software is launched, a developer may select an application with which the developer wishes to incorporate the analytic software on in step 615. FIG. 7 is an exemplary GUI window 700 displayed to a developer to enable selection of a application to be incorporated with the analytic software. As shown in FIG. 7, a window 700 may be displayed to the developer of the IDE that allows the developer to choose the application. Specifically, window 700 may include a list of developer applications 705, where a developer can choose a particular application from the list, that the developer wishes to associate the analytic software with. Further, window 700 may include an other button/tab 710 (e.g., or other mechanism as know by those skilled in the art to execute a process on a computing device), that may allow a developer to choose a different application than one on the list of developer applications 705, that the developer wishes to associate the analytic software with. Further, the developer may select a sign-in button/tab 720, that allows for an authentication procedure where the developer may provide a username and password to access particular information pertaining to applications associated with the developer. Moreover, after the user has selected a particular application (e.g., from the list or after selecting the other button/tab and choosing a particular application), the developer may select a next button/tab 715, to proceed to the next step in installing the analytic software.

Figure 8:
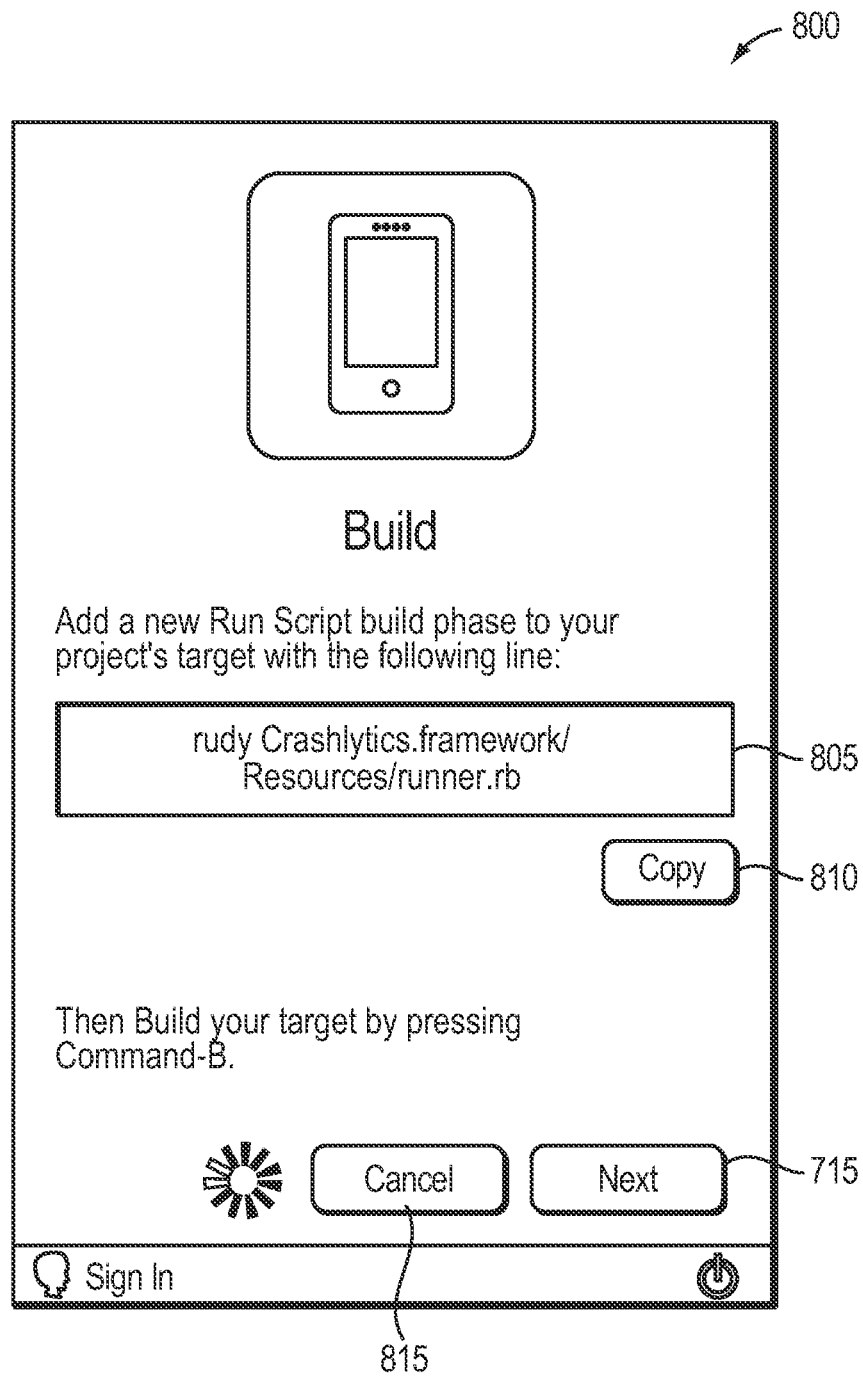
FIG. 8 is an exemplary GUI window displayed to a developer to enable integration of an analytic module on an IDE.

Referring back to FIG. 6, after an application has been selected in step 615, the procedure continues to step 620, where an analytic module may be integrated on the developer's IDE. The analytic module, for example, may assist in gathering debugging information on the IDE that is associated with the application on the developer's IDE. FIG. 8 is an exemplary GUI window 800 displayed to a developer to enable integration of an analytic module on an IDE. As shown in FIG. 8, window 800 may be displayed to the developer of the IDE that assists the developer in integrating the analytic module. Specifically, window 800 may include a new run script 805 that may be displayed to the developer where the new run script, associated with the analytic software, may be integrated by having the developer select the copy button/tab 810. Specifically, the script may be copied into the Xcode build. It is noted that such a copy may be performed explicitly by the user, or may be automated. By incorporating the new run script into the Xcode build, particular information regarding the application may be extrapolated and gathered. Once the analytic module is integrated, next button/tab 715 may become clickable, so that the developer can proceed to the next phase in installing the analytic software. For example, if the new run scrip is not copied or not copied correctly, the next button/tab 715 may be unclickable, so that the user cannot proceed to the next phase until the new run script is copied correctly. Further, the developer may select a cancel button/tab 815, if the developer wishes to cancel integrating the analytic module or cancel the installation process all together.

Figure 9:
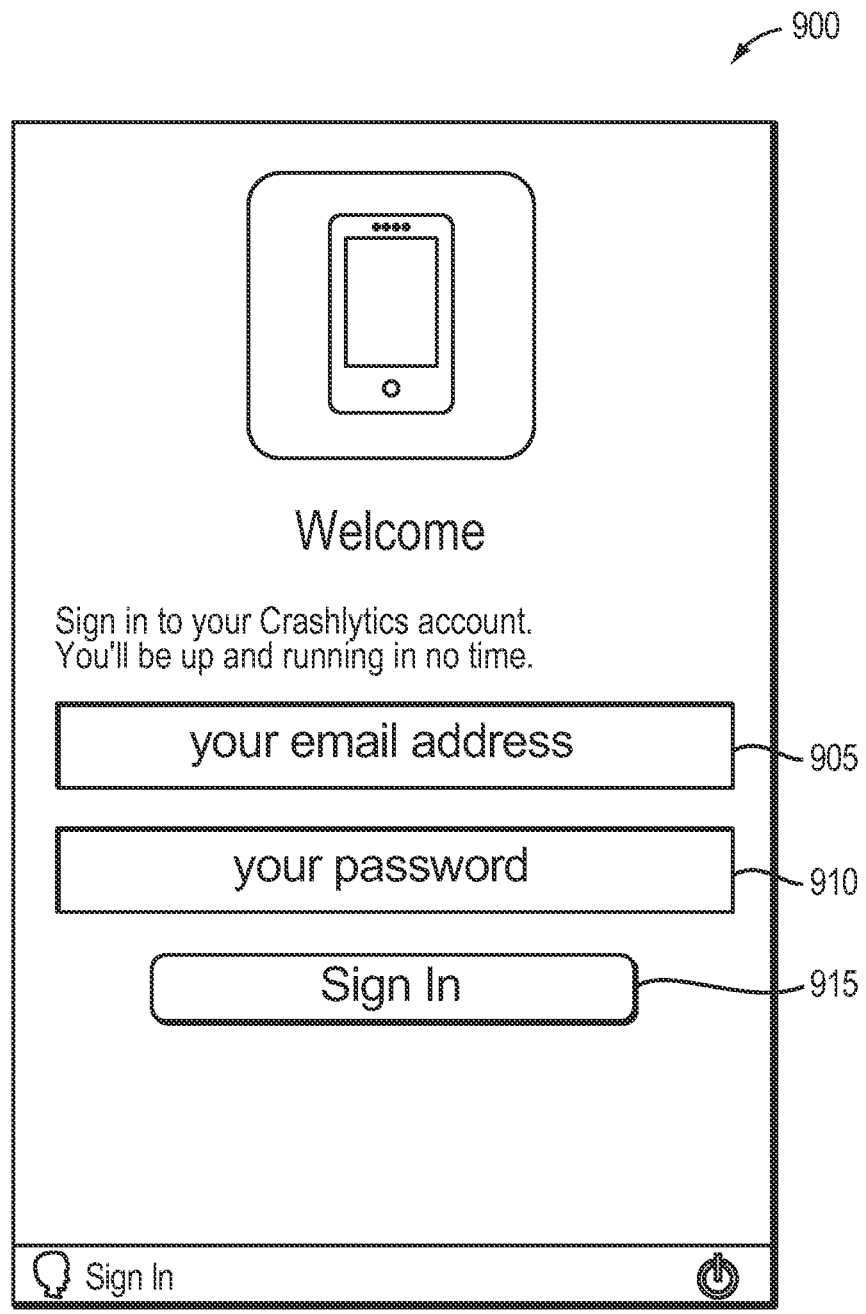
FIG. 9 is an exemplary GUI window displayed to a developer to enable the developer to log in to the system.

Referring back to FIG. 6, after the analytic module has been integrated in step 620, the procedure continues to step 625, where the developer may log into the system (e.g., web server 215 that is managed by the analytic service provider) so that the developer's activity and files/applications associated with the developer may be tracked. It is noted, that if the user logs in prior to integrating the analytic module, step 625 may be skipped. FIG. 9 is an exemplary GUI window 900 displayed to a developer to enable the developer to log into the system. As shown in FIG. 9, window 900 may be displayed to the developer that may allow the developer to log into the system, for example, web server 215. Specifically, a developer may log into the system by providing an email address or other identifier that is unique to the developer in entry field 905. Further, the developer may provide a password in entry 910 that may authenticate the developer. Authentication procedures are well known by those skilled in the art, and it is noted that any authentication procedure may be used. After the developer has provided the correct email address and password, the develop may click button/tab 915 to log into the system (e.g., web server 215). If the email address and password are correct, the developer is authenticated and may have access to the system managed by the analytic service provider (e.g., web server 215), and may further have access to particular information managed by the analytic servicer provider and associated with the application originally created on the developer's IDE, for example. However, if either the email address or password are incorrect, the developer may be denied access to the system, and may be prompted to enter the "correct" email address and/or password.

Figure 10:
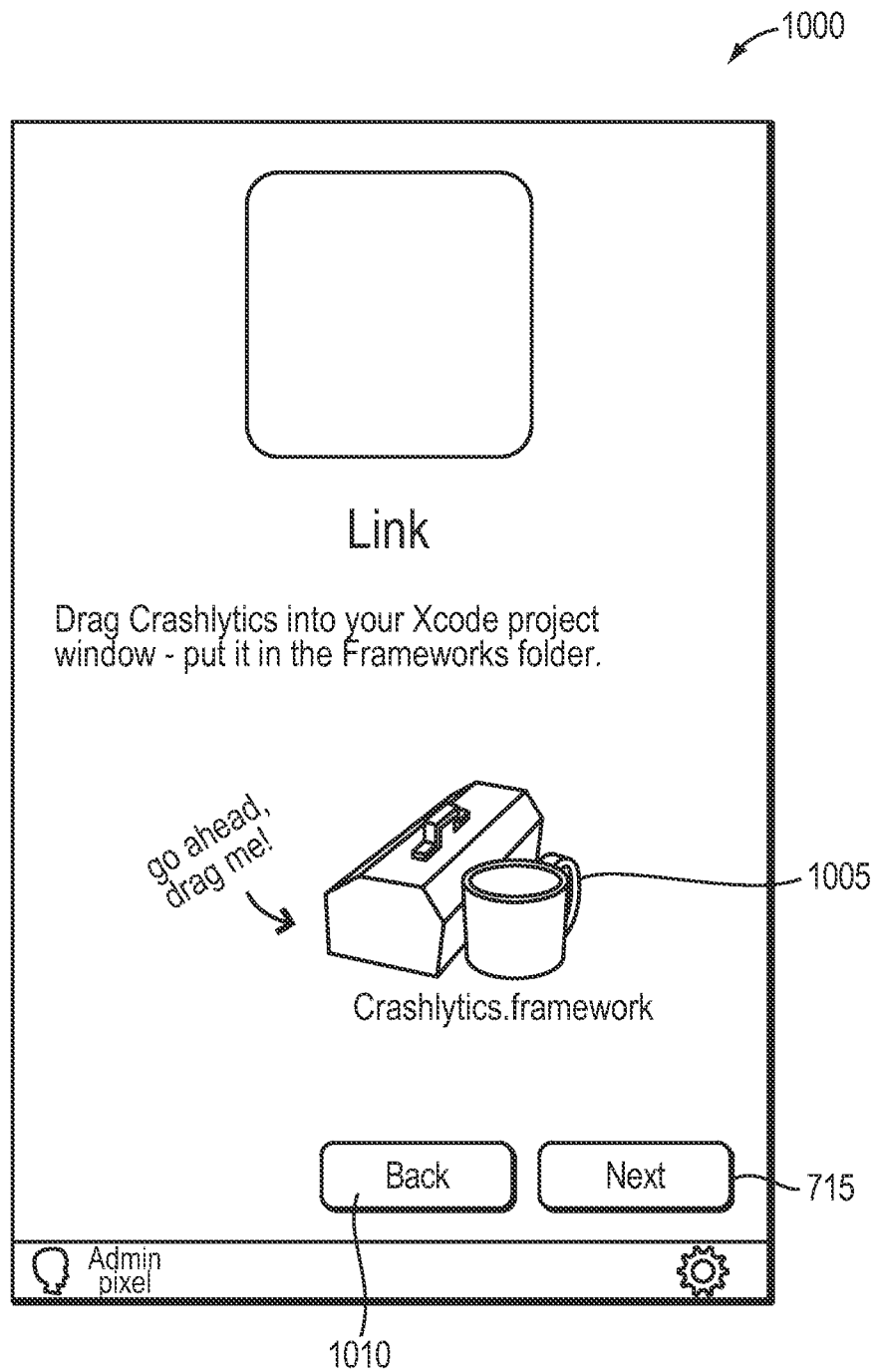
FIG. 10 is an exemplary GUI window displayed to a developer to enable installation of an analytic library on an application.

Referring back to FIG. 6, after the developer has logged in at step 625, the procedure continues to step 630, where the analytic library may be installed in the application selected by the developer's (e.g., selected in step 615). FIG. 10 is an exemplary GUI window 1000 displayed to a developer to enable installation of an analytic library on an application. As shown in FIG. 10, window 1000 may be displayed to a developer that assists the user in installing the analytic library in the application selected by the user. Specifically, window 1000 may include a draggable icon 1005 that may be dropped "into" the selected application. This is accomplished by associating the draggable icon 1005 with an on-disk file path to the analytic library (i.e., which may be copied into application directory during a previous step). When the user initiates a drag operation, the file path may be placed on a Drag and Drop Pasteboard, as know by those skilled in the art, thus "tricking" the selected application into thinking that a file (e.g., the library) was dragged instead of the picture/icon. In a different embodiment, the analytic library may be installed automatically after the developer selects the application at step 615. After the developer has installed the analytic library, the developer may select the next button/tab 715, to proceed to the next phase in the installation of the analytic software. Alternatively, the developer may select the back button/tab 1010 to revert back to step 625 and view window 900.

Figure 11:
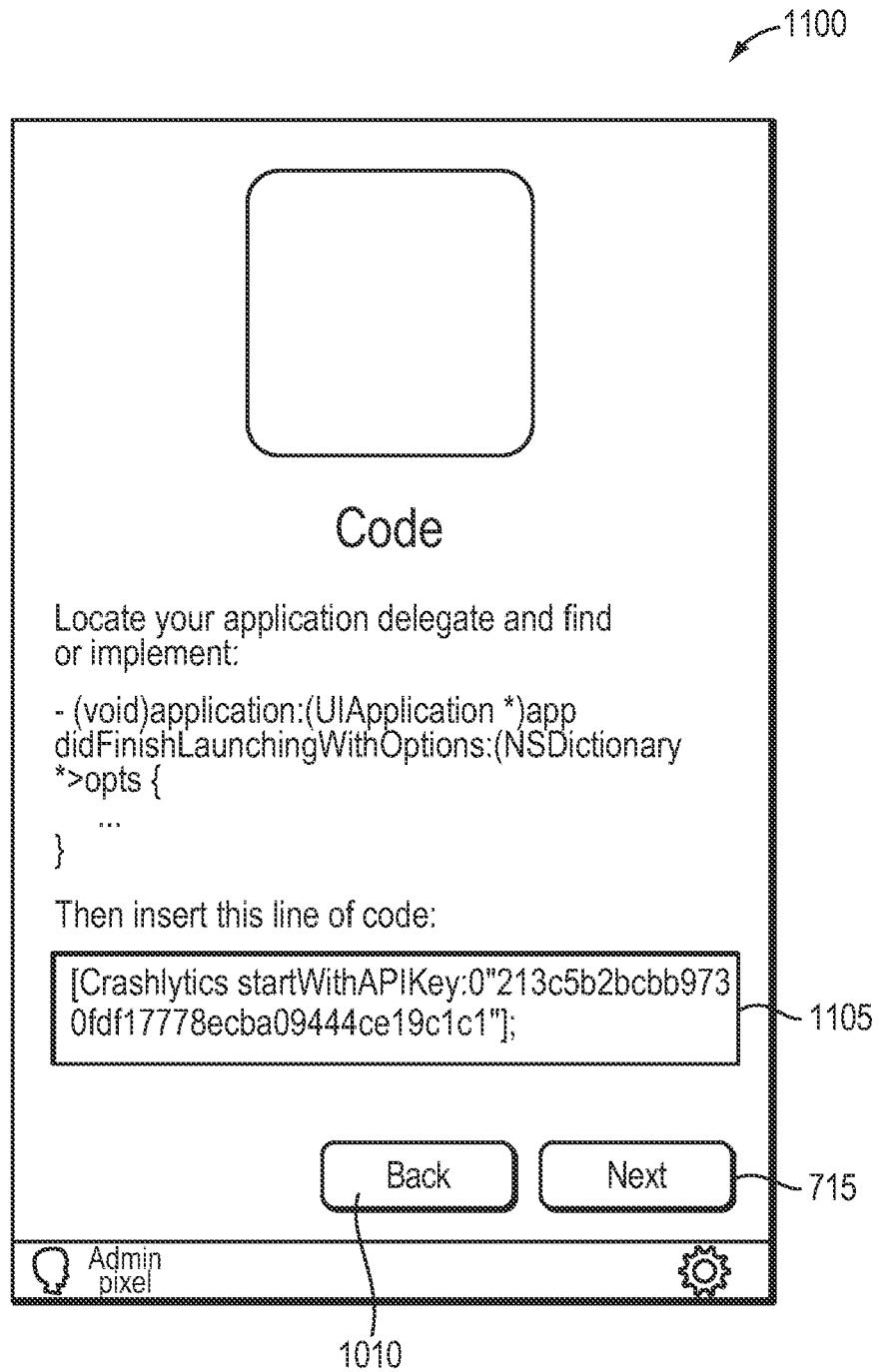
FIG. 11 is an exemplary GUI window displayed to a developer to enable installation of analytic source code on an application.

Referring back to FIG. 6, after the analytic library has been installed on the application in step 630, the procedure continues at step 635, where analytic source code may be installed in the application selected by the developer. FIG. 11 is an exemplary GUI window 1100 displayed to a developer to enable installation of analytic source code on an application. As shown in FIG. 11, a window 1100 may be displayed to the developer. Specifically, the developer may be displayed specific analytic software code 1105 that the user is to incorporate or install within the code associated with the application selected by the developer. After the developer has installed the analytic source code, the developer may select the next button/tab 715, to proceed to the next phase in the installation of the analytic software. Alternatively, the developer may select the back button/tab 1010 to revert back to step 630 and view window 1000.

Figure 12:
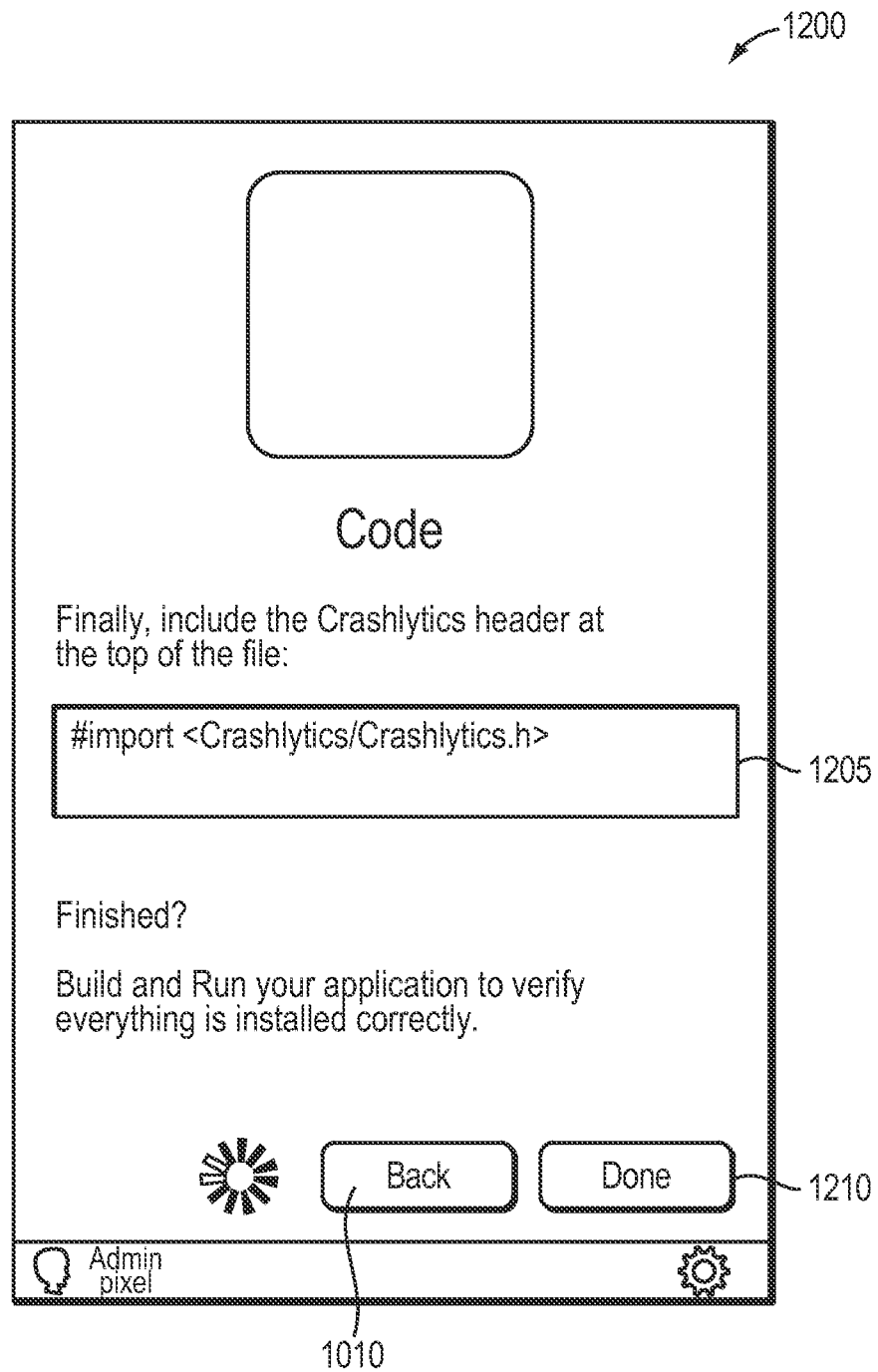
FIG. 12 is an exemplary GUI window displayed to a developer to enable installation of an analytic header on an application.

After selecting the next button/tab 715, the developer may be provided with another window 1200, as shown in FIG. 12, that may display a header 1205, for example, that the developer may incorporate or install within the code associated with the application as part of installing the analytic source code in the application selected by the developer. After it is determined that the analytic software has been installed correctly, a done button/tab 1210 may be clickable to complete the installation of the analytic software. Alternatively, the developer may select the back button/tab 1010 to revert back to window 1100. It should be noted that the installation of the analytic source code and header may be done automatically after the application has been selected, wherein the developer will not be required to manually incorporate the source code or header. At step 640, after the developer logs in the system, he may be provided, through a list, or by any other layout, information associated with applications associated with the developer, information associated with bug(s) incurred by the applications associated with the developer, and other information associated with the developer. Referring back to FIG. 6, after the analytic software has been installed in step 640, procedure 600 ends at step 645.

Figure 13:
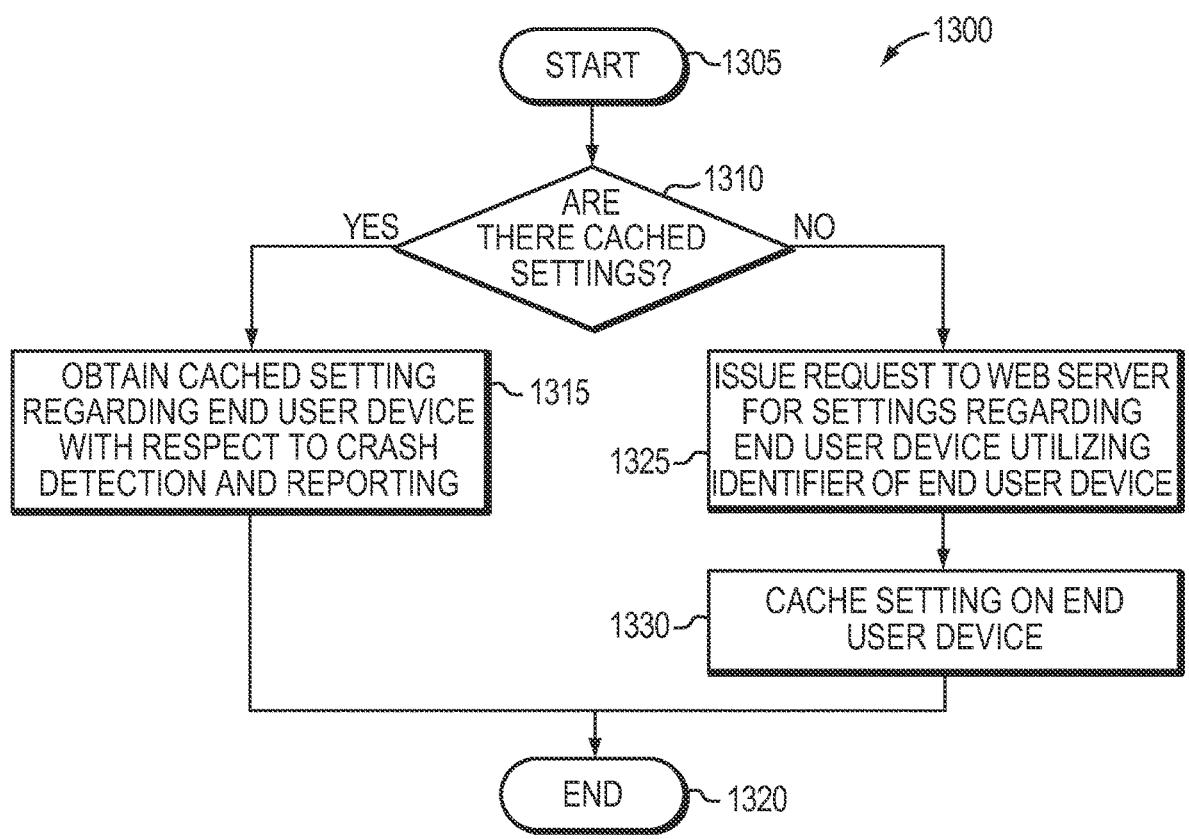
FIG. 13 is a flowchart detailing the steps of an exemplary procedure for obtaining settings associated with crash detection and reporting for an end user's device.

FIG. 13 is a flowchart detailing the steps of an exemplary procedure for obtaining settings associated with crash detection and reporting for an end user's device 400. The procedure 1300 starts at step 1305 and continues to step 1310, where it is determined whether the setting are cached at the end user's device. Such settings may relate to whether the user of the end user device has enabled crash detection and reporting for the end user device, whether crash reporting should first alert the user of the end user device (via a dialog for example) that information will be reported, message text and options for this type of dialog, the extent to which additional device state information is collected, and how long the settings should be cached on the end user device. Thus, the settings may indicate the manner in which the end user device interacts with the web server, managed by the analytic service provider, and what type of information may be provided from the end user device to the web server. For example, assume that the settings indicate that crash detection and reporting is enabled on the end user device. When the application incurs a bug while executing on the end user's device, crash data may be automatically sent from the end user device to the web server, as described above. Alternatively, assume that the settings indicate that crash detection and reporting is not enabled on the end user device. When the application incurs a bug while executing on the end user's device, crash data may not be sent from the end user device to the web server. If the settings are not cached on the end user's device, at step 1325 a request may be issued to the web server, managed by the analytic service provider, to obtain the settings regarding crash detection and reporting at the end user device utilizing an identifier associated with the end user and/or end user device. For example, a GET request of the HTTP protocol, as known by those skilled in the art, may be issued by the end user device to the web server utilizing a unique identifier associated with the end user device to obtain the settings. At step 1330, the settings that are obtained from the server may be cached on the end user device for a time period indicated in the settings. However, if at step 1310 it is determined that the settings are in fact cached at the end user device, the cached settings regarding crash detection and reporting are obtained to determine the manner in which the end user device interacts with the web server and what type of information may be sent from the end user device to the web server. At step 1320, the procedure ends. It is noted that other settings associated with end user device may be cached, and the particular settings are described above are simply exemplary in nature.

Figure 14:
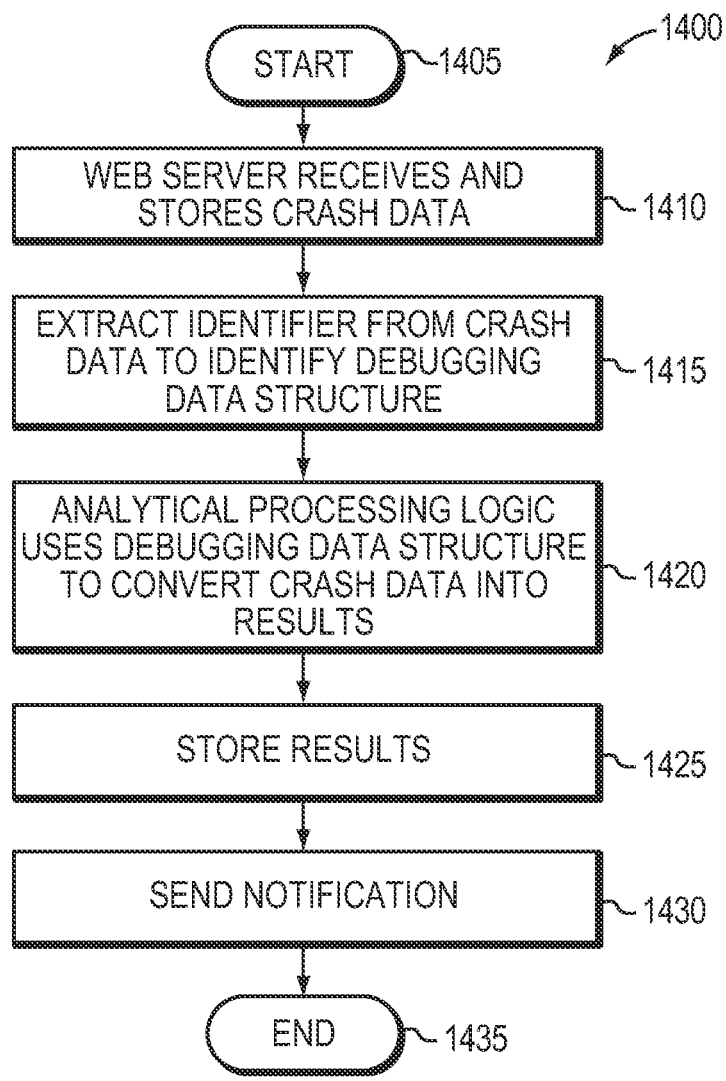
FIG. 14 is a flowchart detailing the steps of an exemplary procedure for performing analytic processing logic on crash data.

FIG. 14 is a flowchart detailing the steps of an exemplary procedure 1400 for performing analytic processing on crash data. Specifically, analytic processing may be managed by and associated with the analytic service provider. Procedure 1400 starts at step 1405 and continues to step 1410 where the web server may receive crash data from an end user device in response to the application on the end user device incurring a bug, and the crash data may then be stored in database 110 that is coupled to web server 200. At step 1415, the web server may extract an identifier (e.g., UUID) from the crash data to identify a particular debugging data structure (e.g., dSYM file) associated with the application that incurred the bug. At step 1420, analytic processing logic 125 may then use the debugging data structure (e.g., dSYM file) to convert the crash data into results. For example, the analytic processing logic 125 may utilize the "dwarfdump" feature in conjunction with the debugging data structure, that is know by those skilled in the art, to convert the raw memory addresses present in the crash data into source code file names, method names, and line numbers, etc. Such information may be useful in rectifying the bug and learning more about what caused the bug. This process is commonly knows as "symbolication" by those skilled in the art. The DWARF debugging features are well-known and described in more detail in the previously incorporated by reference "DWARF Debugging Information Format," dated Jul. 27, 1993. At step 1425, the converted results may be stored in database 110. At step 1430, the developer of the application may be notified that information regarding a bug (e.g., the converted raw data) associated with the application is available for the developer's viewing. For example, it may be determined whether the bug has tripped one of the notification thresholds (e.g., a particular bug) and, if so, notify the developer via email. The developer may then access web server 215, for example utilizing a login and password as described above, to view the results. Further, it is noted that bugs associated with a application may be given an impact score based on the number of crashes, the number people affected by the bug, the percentage of user affected, and other important criteria that may help signify the seriousness of the bug. This impact score may be provided to the developer through the web server 215, thus allowing the developer to understand the "seriousness" of the bug. The procedure then ends at step 1435.

Figure 15:
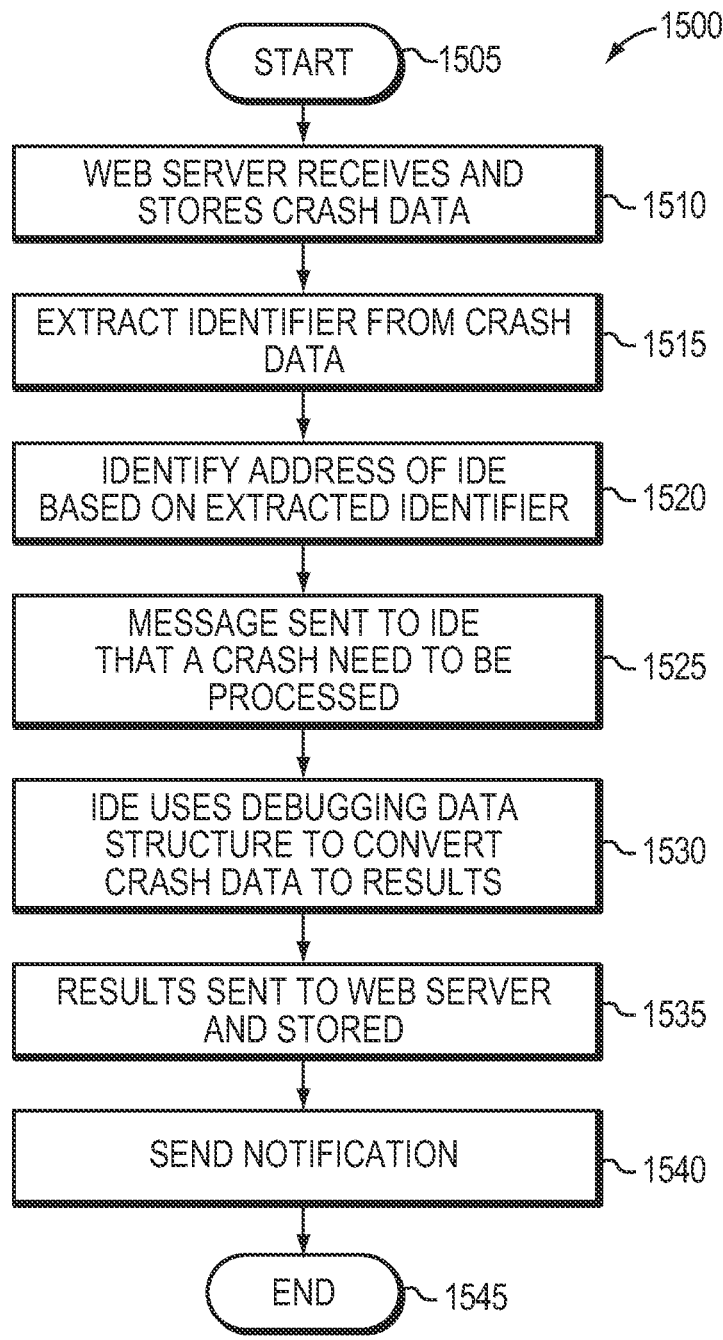
FIG. 15 is a flowchart detailing the steps of an exemplary procedure for performing analytic processing logic on crash data.

FIG. 15 is a flowchart detailing the steps of an exemplary procedure 1500 for performing analytic processing logic on crash data. Specifically, the analytic processing logic may reside on the developer's IDE. This embodiment may be favored by developers who do not want to send debugging information over a network to the web server due to regulatory or compliance constraints. Procedure 1500 starts at step 1505 and continues to step 1510 where the web server may receive crash data from an end user device in response to the developer's application on the end user device incurring a bug, and the crash data may then be stored in database 110 that is coupled to web server 200. At step 1515, the web server may extract an identifier (e.g., UUID) from the crash data to identify a particular debugging data structure (e.g., dSYM file) associated with the developer's application that incurred the bug. At step 1520, the extracted identifier is then used to identify an address (e.g., URL/IP address) associated with the developer's IDE. At step 1525, a message may be sent to the developer, via email for example, informing the developer that a bug associated with the application needs to be processed. At step 1530, analytic processing logic on the IDE may then use the debugging data structure (e.g., dSYM file) to convert the crash data into results. Such information may be useful in rectifying the bug and learning more about what caused the bug. For example, the analytic processing logic on the IDE may utilize the "dwarfdump" feature and in conjunction with the debugging data structure, that is know by those skilled in the art, to convert the raw memory addresses present in the crash data into source code file names, method names, and line numbers, etc. This process is commonly knows as "symbolication" by those skilled in the art. It can be assured that the "dwarfdump" feature is installed on the IDE because the IDE is the system that created the debugging data structure (e.g., dSYM file) associated with the developer's application in the first place. At step 1535, the converted results may be sent to the web server and stored in database 110. At step 1540, the developer of the application may be notified that information regarding a bug associated with the developer's application is available for the developer's viewing. For example, it may be determined whether the bug has tripped one of the notification thresholds (e.g., a particular bug) and, if so, notify the developer via email. The developer may then access web server 215, for example utilizing a login and password as described above, to view the results. The procedure then ends at step 1545.

Figure 16:
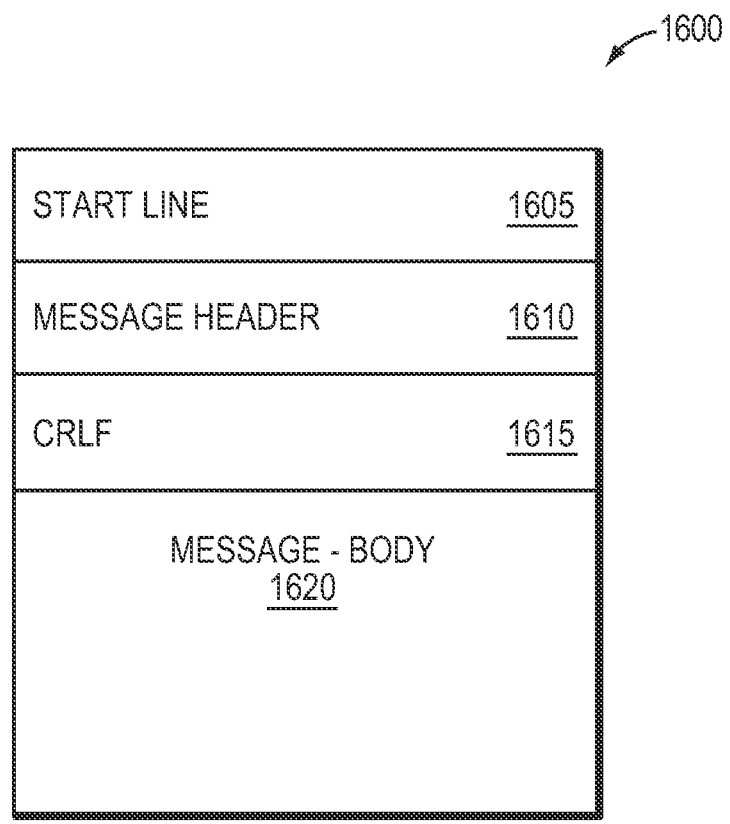
FIG. 16 is an exemplary message data structure that may be sent between the various entities of computing environment.

FIG. 16 is an exemplary message 1600 that may be sent between the various entities of computing environment. For example, message 1600 may be an HTTP message. Such HTTP messages may include POST, PUT, GET messages, as known by those skilled in the art and described in more detail in the Request for Comments (RFC) 2616, entitled "Hypertext Transfer Protocol— HTTP/1.1," dated June 1999, the contents of which are hereby incorporated by reference. Specifically, the message 1600 may have a start-line field 1605 that may include a request-line for a request message that begins with a method token, or a status line for a response message consisting of the protocol version followed by a numeric status code and its associated textual phrase. Further, message 1600 may include a message header 1610, and a Carriage Return Line Feed (CRLF) field 1615, as known by those skilled in the art. Moreover, message 1600 may include a message body 1620 that is used to carry the entity-body associated with the request or response. For example, message body 1620 may carry the debugging information or the crash data.

Figure 17:
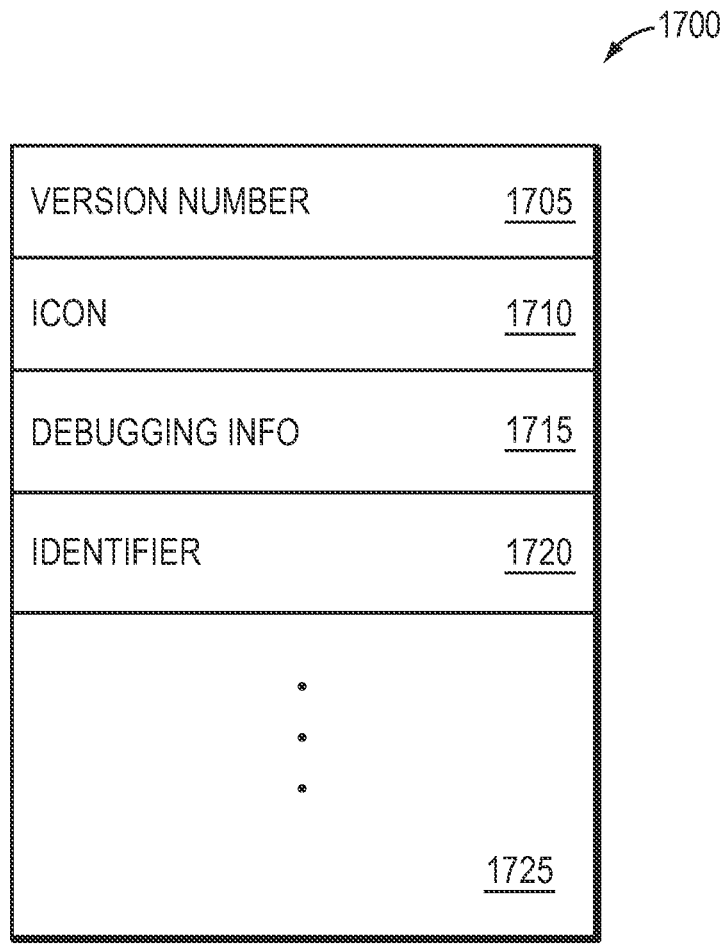
FIG. 17 is an exemplary message body data structure that may be sent from a developer's IDE to a web server.

FIG. 17 is an exemplary message 1700 body that may be sent from a developer's IDE to a web server. Specifically, the message body 1700 may be associated with an HTTP message. For example, message body 1700 may be associated with a POST HTTP message that an IDE may utilize to post specific information to the web servers 200. Specifically, message body 1700 may send particular information, associated with the build of the developer's application on the IDE, from the IDE to the web server 200. Such information may include version number 1705, icon 1710, debugging information (e.g., dSYM file) 1715, and identifier 1720 associated with the debugging information. Further, it is noted that other fields 1725 and information may be within message body 1700.

Figure 18:
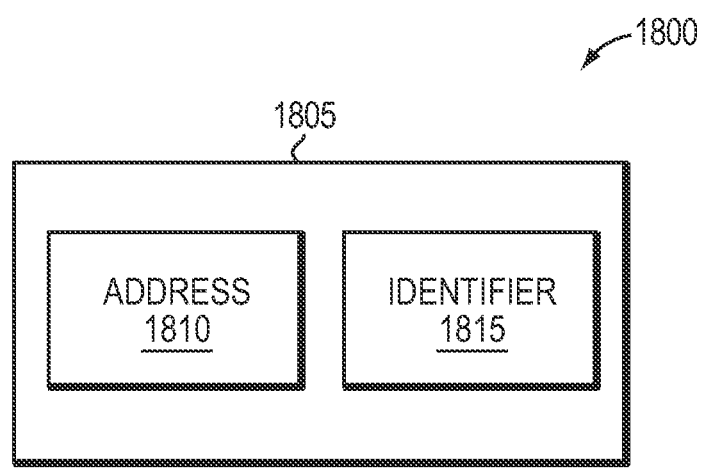
FIG. 18 is an exemplary message body data structure that may be sent from a developer's IDE to a web server.

FIG. 18 is an exemplary message body 1800 that may be sent from a developer's IDE to a web server. For example, message body 1800 may be associated with a POST HTTP message that an IDE may utilize to post specific information to the web server 200. Specifically, message body 1800 may send particular information, associated with the build of the developer's application on the IDE, from the IDE to the web server 200. Such information may include an identifier 1805 extracted from debugging information and associated with developer's application, and an address 1810 associated with the developer's IDE (e.g., IP address). That information may then be stored on database 110.

Figure 19:
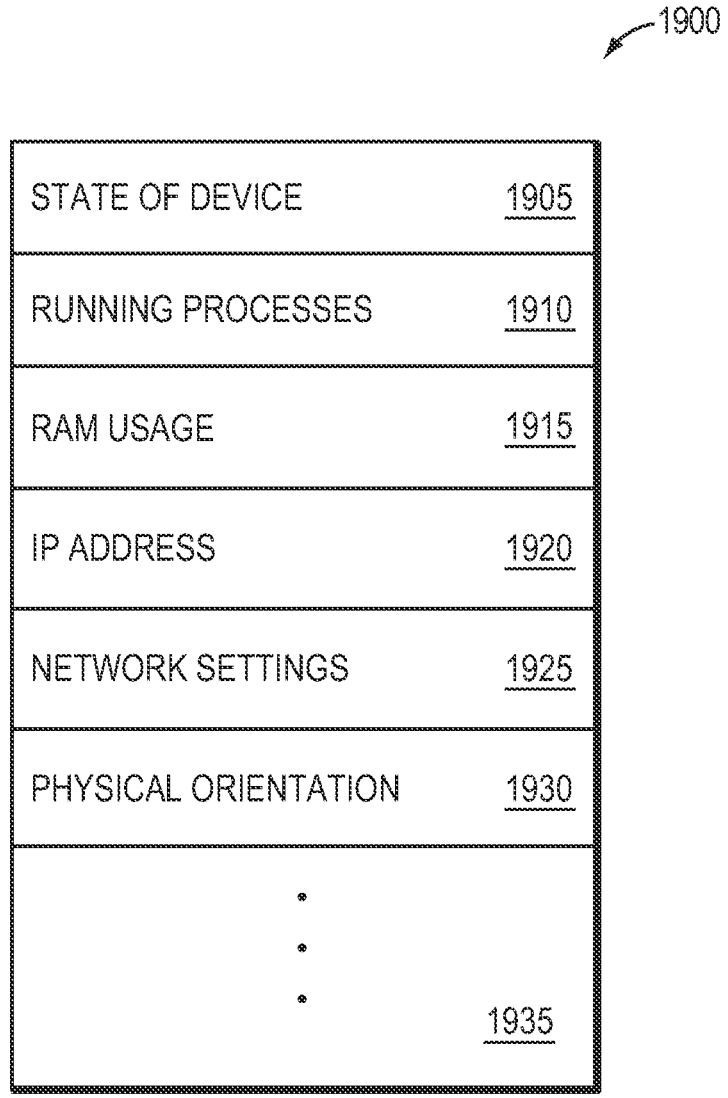
FIG. 19 is an exemplary message body data structure that may be sent from an end user device to a web server.

FIG. 19 is an exemplary message body 1900 that may be sent from an end user device to a web server. For example, message body 1900 may be associated with a POST HTTP message that an end user device may utilize to post specific information to the web servers 200. Specifically, message body 1900 may send particular crash data associated with a bug of the developer's application being executed on the end user's device. Such information may include a field 1905 to store a state of the end user device, a field 1910 to store the processes running on the end user device, a field 1915 to store RAM used by the end user device, an IP address field 1920 to store an IP address associated with the end user device, a network settings field 1925 to store network settings associated with the end user device, and a physical orientation field 1930 to store a physical orientation of the end user device, when the developer's application incurs the bug. Further, it is noted that other crash data may be included in field 1935.

Figure 20:
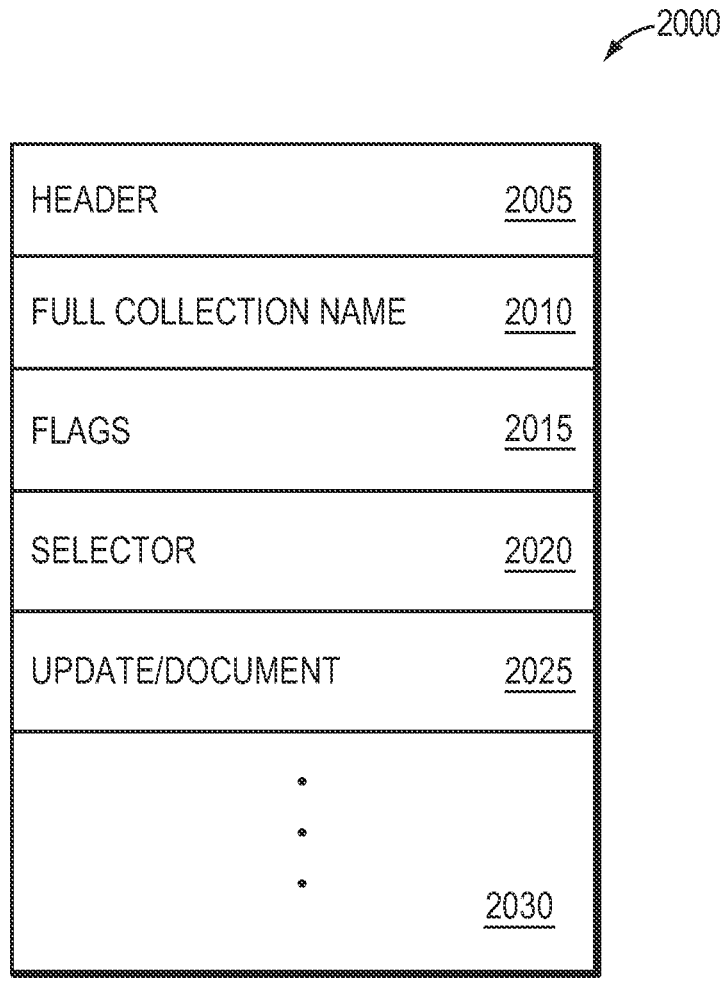
FIG. 20 is an exemplary message data structure that may be sent between a web server and a database.
Figure 22:
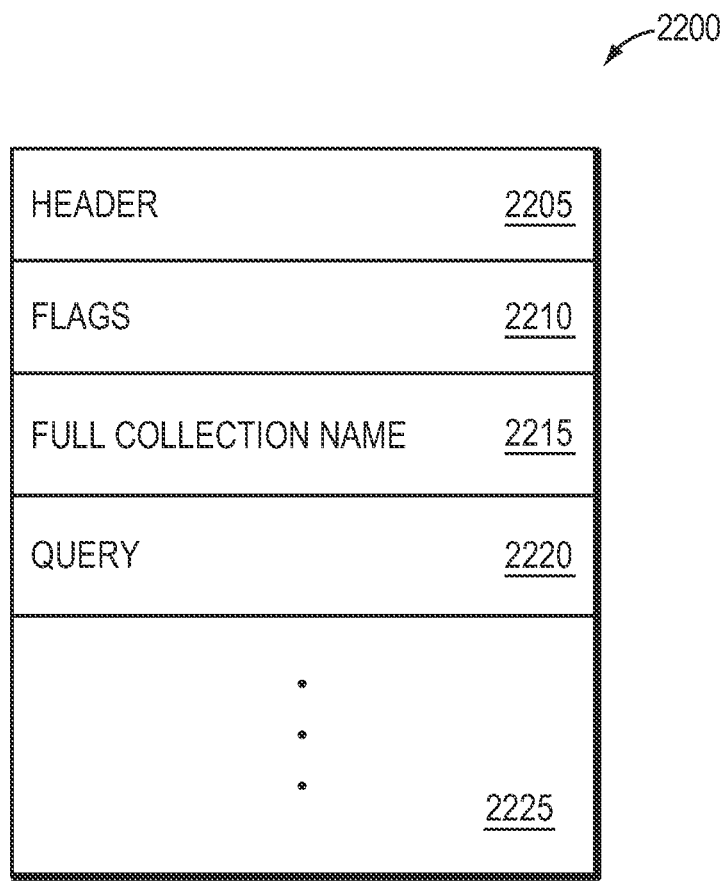
FIG. 22 is an exemplary messages data structure that may be sent between a web server and a database.

FIGS. 20-22 are exemplary messages that may be sent between a web server and a database, such as mongoDB messages as known by those skilled in the art. Message 2000 for example, may have a header field 2005, Full Collection Name field 2010, flags field 215, selector field 2020, update/document field 2025, and fields 2030 that may be used to transport other pertinent date, as known by those skilled in the art. Message 2000 may be used by the web server to update a document that is currently stored on the database. For example, information associated with the developer's IDE may change, where that information may need to be updated in database 110. The message header 2005 may include identification information, such as the total size of the message, an identifier that uniquely identifies the message, and/or a type of the message. Further, the Full Collection Name field 2010 may be the concatenation of the database name with the collection name, using a "." for the concatenation. For example, for the database "foo" and the collection "bar", the full collection name may be "foo.bar". The flags field 2015 may include a bit instruction as to how the database should utilize the received information. For example, if an "upsert" bit is set, the database may insert the supplied object in the collection if no matching document is found. Selector field 2020 may specify the query for selection of the document to update, and update/document field 2025 may specify the update to be performed.

FIG. 21 is an exemplary message 2100 that may be sent between a web server and a database. Specifically, message 2100, such as a MongoDB message, may be sent from the database back to the web server for example, and may be referred to a database response message. Message 2001 may have a header field 2105, response flags field 2110, cursor ID field 2115, a starting from field 2120, number returned field 2125, documents field 2130, and fields 2135 that may be used to transport other pertinent date, as known by those skilled in the art. The message header 2005 may include identification information, such as the total size of the message, an identifier that uniquely identifies the message, and a type of the message. Further, response flag field 2110 may include a bit instruction how the database should utilize the received information. For example, a "QueryFailure" bit may be set when a query has failed. CursorID field 2115 may represent a cursor that the reply is a part of, as know by those skilled in the art. Starting from filed 2120 may indicate where in the cursor the reply is starting. Number returned field 2125 indicates a number of documents in the reply, and documents field 2130 indicates the specific documents.

FIG. 22 is an exemplary messages 2200 that may be sent between a web server and a database. Specifically, message 220, such as a MongoDB message, may be sent by the web server to query the database. Message 2200 may have a header field 2205, flags field 2210, Full Collection Name Field 2215, a query field 2220, and fields 2225 that may be used to transport other pertinent date, as known by those skilled in the art. The message header 2005 may include identification information, such as the total size of the message, an identifier that uniquely identifies the message, and a type of the message. Further, flags field 2210 may include a bit instruction as to how the database should utilize the received information. For example, a "SlaveOk" bit may be set to allow a query of replica slave, as known by those skilled in the art. Further, the Full Collection Name field 2215 may be the concatenation of the database name with the collection name, using a "." for the concatenation. For example, for the database "foo" and the collection "bar", the full collection name may be "foo.bar". A query field 2220 may contain one or more elements, all of which must match for a document to be included in a set of results. Field 2225 may include other fields that are pertinent with a query request (e.g., number of documents to skip and a number of documents to return).

Figure 23:
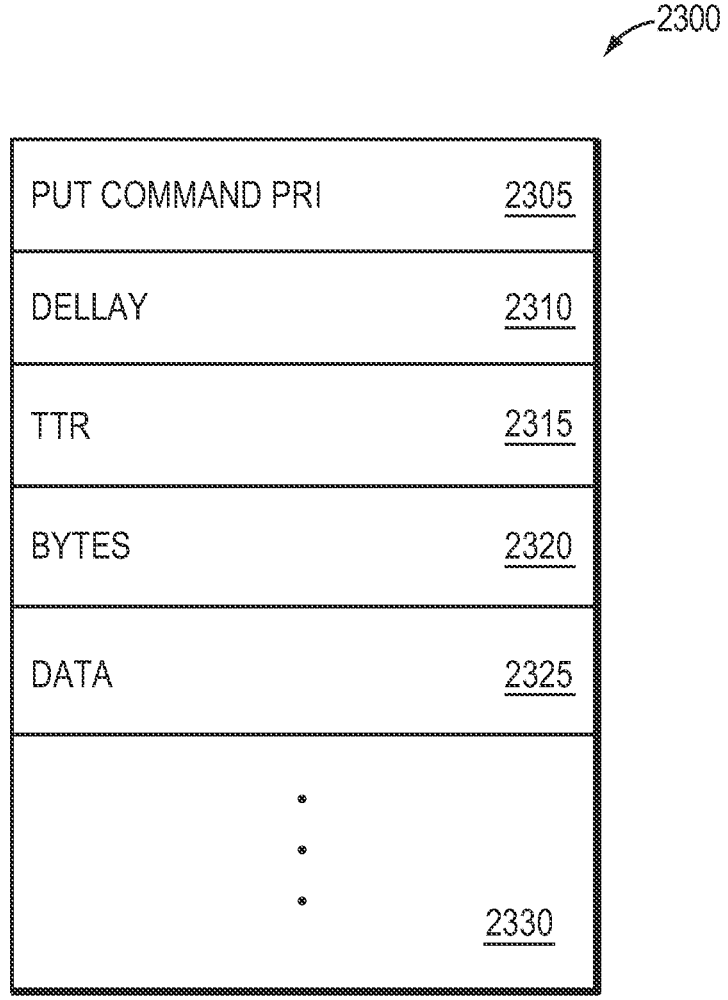
FIG. 23 is an exemplary message data structure that may be sent between a web server and analytic processing logic.

FIG. 23 is an exemplary message 2300 that may be sent between a web server and analytic processing logic. For example, message 2300 may be a PUT command of the beanstalk protocol, as known by those skilled in the art. Message 2300 may include a PRI field 2305, delay field 2310, TTR field 2315, bytes field 2320, data field 2320, and fields 2330 that may be used to transport other pertinent date, as known by those skilled in the art. PRI field 2305 may be an integer representing a priority of the message 2300, wherein the most urgent priority may be an integer value of 0. Delay field 2310 may be an integer number of seconds to wait before putting the job, e.g., PUT command, in a queue for processing. The job will be in a "delayed" state, during this time period. The TTR field 2315 may represent a "time to run" and may be an integer number of seconds to allow a worker (e.g., a worker thread) to run the job. For example, the time may be counted from the moment a worker reserves the job. Bytes field 2320 may be an integer value indicate the size of the job body, and data field 2320 may include the job body.

D. Post-Fact On-Device Symbolication

An alternative embodiment is post-fact on-device symbolication and may be performed during the period post fact on device and enables the symbolication of a crash during a future execution of a copy of the application. This enables symbolication to occur on the end user device without interaction with the web server, etc. As known by those skilled in the art, the Apple operating system (e.g., iOS 5), utilizes Address-Space Layout Randomization (ASLR). ASLR moves the application binary around in memory, on the end user device for example, and thus changes all of the memory addresses associated with the crash data that is to be symbolicated. Thus, symbolicating crash data in a subsequent execution of the application would produce results that are not accurate/correct. Further, and as known by those skilled in the art, an application is typically compiled with an assumed-fixed base-address that represents the address at which the compiler believes the binary image associated with the application will be loaded into memory on the end user's device. ASLR breaks this assumption and translates between the assumed addresses and the actual addresses where the binary is loaded into memory. This delta, as known by those skilled in the art, is a "slide" of the binary. Thus, ALSR can be seen as a technique for choosing a random "slide" for the binary each time the application launches on the end user device. Some implementations leverage ASLR to determine a relative slide between two launches of an application. By determining the relative slide between two launches, the crash data on the end user device can be symbolicated during any future execution of the application. Advantageously, the symbolication of the crash data may be accomplished without requiring the developer to send a copy of the application to the web server. As discussed above, the developer may not want to send a copy of the application due to privacy reasons, regulatory constraints, or compliance constraints.

Figure 24:
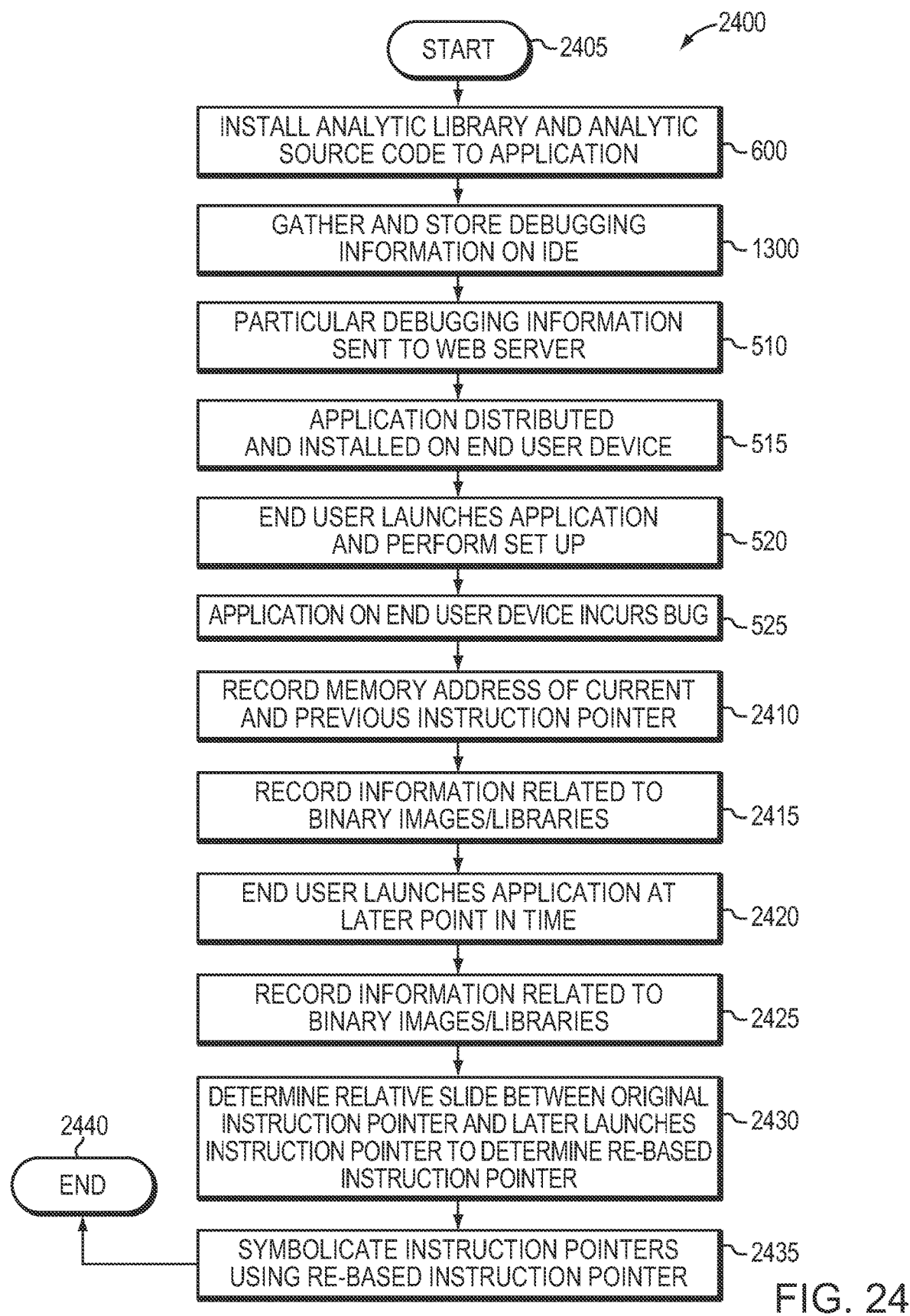
FIG. 24 is a flowchart detailing the steps of a procedure for post-fact on-device symbolication.

FIG. 24 is a flow chart detailing the steps of a procedure 2400 for post fact on device symbolication. The procedure 2400 begins in step 2405 and continues to step 600, described above in reference to FIG. 6, where analytic source code and/or an analytic library is installed within the application on an IDE. In step 1300, debugging information (e.g., version number, icon, dSYM file) may be locally stored on the IDE. In step 510, particular debugging information, such as an identifier, extracted from the debugging information that remains resident on the developer's system, is sent to the web server, wherein the identifier is associated with an address of the developer's system (e.g., IP address) and indexed. In step 515, the application may be distributed and installed on end user devices, such as mobile phones or other entities. For example, the application may be downloaded on the end user device over a cellular network or any other type of network. For example, the application may be available to end users through libraries associated with particular end user devices (e.g., iTunes on an iPhone). The end user may then select the develop application from the library and download the application on the end user device. The end user may then utilize the application on his/her end user device. In other instances, the application may simply be available on a particular website that the user may find through conventional web based search techniques. After finding the application, the user may then download the application from the website and utilize the application on the end user device. As is known to those skilled in the art, applications may be available for installation on an end user device through various techniques, and the techniques described above are simply exemplary in nature.

In step 520, the application may be launched, by an end user for example, on the end user device. The end user may then utilize the application, that includes the analytic library and/or the analytic software, on the end user device. The end user may, for example, go through a series of set up steps associated with crash detection and reporting. For example, some users may determine that they do not want to enable crash detection and reporting for privacy reasons or other reasons. In such a case, the user of the end user device may indicate, utilizing a keypad associated with the end user device, that he/she wishes to disable crash detection and reporting on the end user device. Thereafter, for example when network connectivity is obtained (e.g., cell phone network or WIFI network), the preference indicated by the user may be transmitted to the web server. Thereafter, when the application incurs a bug, the crash data may remain on the end user device instead of sending the crash data to web server 200 for analytic processor.

In step 525, the application on the end user device encounters a bug. For example, the application may crash unexpectedly or may behave in a manner not intended.

In response to the application incurring a bug in step 525, the procedure 2400 continues to step 2410 where the memory address of the current instruction pointer, as well as all previous instruction pointers contained within the stack are recorded. Illustratively, the analytic code installed within the application records this information in persistent memory of the end user device for later retrieval. The procedure then continues to step 2415 and information related to binary images and/or libraries is recorded. Specifically, a list of all binary images/libraries that are utilized by or comprise the crash application are recorded. More specifically, for each of the binary images/libraries, a universally unique name (UUID) and a start and end address may be recorded.

In step 2420, the end user launches the application at a later point in time. Typically, after a crash of an application, an end-user may quickly close the application and relaunch the application to continue performing whatever functions they were attempting. However, there may be a time delay before the application is relaunched by the user. Upon the relaunching of the application at a later point in time, the analytic software records information relating to all binary images and or libraries in step 2425. Illustratively, the same information is recorded as was previously recorded in step 2415. However, because there would be variations in the start and end addresses of the various images/libraries, the starting and ending address of the later execution of the application will be different from the original execution by a relative slide (e.g., offset).

In step 2430, the relative slide between the original instruction pointer and the later launched (e.g., relaunched) instruction pointer is determined to generate a rebased instruction pointer. Moreover, and for each recorded instruction pointer for the crash, a library responsible for a line of code associated with the application is determined by figuring out which start and end addresses surround the respective instruction pointer. Thereafter, the identifier from the recorded list associated with the library, that was determined for the respective instruction pointer, is loaded and the start address is subtracted from the instruction pointer in order to arrive at a "de-based" instruction pointer. The current list of libraries are searched for the identifier, wherein after the identifier is found in the list, the identified library's start address is added to the debased instruction pointer resulting in a "re-based" instruction pointer. The difference between the original pointer and the "re-based" pointer is the relative slide between the two executions of the application (e.g., the difference between the start address of the library at a previous time and the current time).

Then, in step 2435, the instruction pointer may be symbolicated using the re-based instruction pointers. That is, each re-based pointer can be symbolicated using the dladdr( ) function, as known by those skilled in the art, that loads the symbol at the address. Advantageously, symbolication can be achieved without the developer sending the application to the server.

The procedure 2400 then ends in step 2440.

Advantageously, the embodiments disclosed herein provide methods for providing a developer of an application pertinent information associated with errors, bugs, or defects associated with the application that is executing on an end user's device.

What is claimed is:

1. A computer-implemented method when executed by data processing hardware of a user device causes the data processing hardware to perform operations comprising:
   receiving crash data associated with a crashed application that previously executed on the user device;
   receiving a first memory address of a current instruction pointer of the crashed application;
   receiving relaunched data associated with a relaunched application relaunched on the user device, the relaunched application the same as the crashed application;
   receiving a second memory address of a current instruction pointer of the relaunched application;
   determining a memory address offset between the first memory address of the current instruction pointer of the crashed application and the second memory address of the current instruction pointer of the relaunched application, the memory address offset representing a relative slide between a starting address of the crashed application and a starting address of the relaunched application;
   determining crash information associated with the crashed application using the memory address offset; and
   providing the crash information to a user of the user device.

2. The method of claim 1, wherein determining the memory address offset comprises generating a rebased instruction pointer associated with the crashed application.

3. The method of claim 2, wherein generating the rebased instruction pointer comprises identifying a library from a list of libraries associated with code of the crashed application.

4. The method of claim 3, wherein identifying the library from the list of libraries associated with the code of the crashed application comprises determining an address identifier associated with each library of the list of libraries.

5. The method of claim 4, wherein the operations further comprise:
   generating a debased instruction pointer by subtracting a first start address associated with the current instruction pointer of the relaunched application from a second start address associated with the current instruction pointer of the crashed application;
   identifying the address identifier in a current list of libraries associated with the crashed application; and
   determining a library start address associated with the address identifier in the current list of libraries.

6. The method of claim 5, wherein generating the rebased instruction pointer comprises adding a debased instruction pointer address to the library start address.

7. The method of claim 6, wherein determining the memory address offset comprises obtaining a difference between the rebased instruction pointer and a resource address associated with the relaunched application.

8. The method of claim 1, wherein determining the crash information associated with the crashed application comprises:
   determining symbolication of the crash data; and
   enabling the symbolication for future launches of the crashed application to the user of the user device.

9. The method of claim 8, wherein determining symbolication of the crash data comprises using a dladdr( ) function that loads a symbol at a respective memory address.

10. The method of claim 1, wherein the operations further comprise:
    after receiving crash data associated with the crashed application, determining a list of libraries used by the crashed application; and
    for each library in the list of libraries, determining a universally unique name and a start and end address associated with the crash data.

11. A system comprising:
    data processing hardware of a user device; and
    memory hardware in communication with the data processing hardware, the memory hardware storing instructions that when executed on the data processing hardware cause the data processing hardware to perform operations comprising:
       receiving crash data associated with a crashed application that previously executed on the user device;
       receiving a first memory address of a current instruction pointer of the crashed application;
       receiving relaunched data associated with a relaunched application relaunched on the user device, the relaunched application the same as the crashed application;
       receiving a second memory address of a current instruction pointer of the relaunched application;
       determining a memory address offset between the first memory address of the current instruction pointer of the crashed application and the second memory address of the current instruction pointer of the relaunched application, the memory address offset representing a relative slide between a starting address of the crashed application and a starting address of the relaunched application;
       determining crash information associated with the crashed application using the memory address offset; and
       providing the crash information to a user of the user device.

12. The system of claim 11, wherein determining the memory address offset comprises generating a rebased instruction pointer associated with the crashed application.

13. The system of claim 12, wherein generating the rebased instruction pointer comprises identifying a library from a list of libraries associated with code of the crashed application.

14. The system of claim 13, wherein identifying the library from the list of libraries associated with the code of the crashed application comprises determining an address identifier associated with each library of the list of libraries.

15. The system of claim 14, wherein the operations further comprise:
generating a debased instruction pointer by subtracting a first start address associated with the current instruction pointer of the relaunched application from a second start address associated with the current instruction pointer of the crashed application;
identifying the address identifier in a current list of libraries associated with the crashed application; and
determining a library start address associated with the address identifier in the current list of libraries.

16. The system of claim 15, wherein generating the rebased instruction pointer comprises adding a debased instruction pointer address to the library start address.

17. The system of claim 16, wherein determining the memory address offset comprises obtaining a difference between the rebased instruction pointer and a resource address associated with the relaunched application.

18. The system of claim 11, wherein determining the crash information associated with the crashed application comprises:
determining symbolication of the crash data; and enabling the symbolication for future launches of the crashed application to the user of the user device.

19. The system of claim 18, wherein determining symbolication of the crash data comprises using a dladdr( ) function that loads a symbol at a respective memory address.

20. The system of claim 11, wherein the operations further comprise:
after receiving crash data associated with the crashed application, determining a list of libraries used by the crashed application; and
for each library in the list of libraries, determining a universally unique name and a start and end address associated with the crash data.

* * * * *